(12) United States Patent
Chang et al.

(10) Patent No.: US 9,794,874 B2
(45) Date of Patent: Oct. 17, 2017

(54) ELECTRONIC DEVICE AND METHOD FOR SIGNAL TRANSMISSION AND RECEPTION

(71) Applicant: Samsung Electronics Co., Ltd., Suwon-si, Gyeonggi-do (KR)

(72) Inventors: Dukhyun Chang, Suwon-si (KR); Chaeman Lim, Seoul (KR); Jungwoo Lee, Suwon-si (KR); Hyoungjoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/922,517

(22) Filed: Oct. 26, 2015

(65) Prior Publication Data

US 2016/0119870 A1 Apr. 28, 2016

(30) Foreign Application Priority Data

Oct. 24, 2014 (KR) .......................... 10-2014-0145566

(51) Int. Cl.
| | | |
|---|---|---|
| *H04W 4/00* | (2009.01) | |
| *H04M 1/00* | (2006.01) | |
| *H04W 52/02* | (2009.01) | |
| *H04W 12/06* | (2009.01) | |
| *H04W 24/02* | (2009.01) | |
| *H04L 29/06* | (2006.01) | |
| *H04W 84/12* | (2009.01) | |

(Continued)

(52) U.S. Cl.
CPC ..... *H04W 52/0212* (2013.01); *H04L 63/0272* (2013.01); *H04W 12/06* (2013.01); *H04W 24/02* (2013.01); *H04W 12/02* (2013.01); *H04W 84/12* (2013.01); *H04W 88/06* (2013.01); *Y02B 60/50* (2013.01)

(58) Field of Classification Search
CPC ..... H04W 12/06; H04W 84/12; H04W 88/06; H04W 92/02; H04W 88/16; H04W 76/02; H04W 8/26; H04W 76/04; H04W 88/08; H04W 12/08; H04W 36/0016; H04W 36/14; H04W 80/04; H04W 48/18; H04W 76/025; H04W 88/12
See application file for complete search history.

(56) References Cited

U.S. PATENT DOCUMENTS

| | | | |
|---|---|---|---|
| 8,155,080 B2* | 4/2012 | Lim | ................... H04W 36/0016 370/328 |
| 8,199,700 B2 | 6/2012 | Jun et al. | |
| 2007/0224988 A1 | 9/2007 | Shaheen | |

(Continued)

FOREIGN PATENT DOCUMENTS

| | | |
|---|---|---|
| KR | 10-2008-0050202 A | 6/2008 |
| KR | 10-2014-0052083 A | 5/2014 |

*Primary Examiner* — Olumide T Ajibade Akonai
(74) *Attorney, Agent, or Firm* — Jefferson IP Law, LLP

(57) ABSTRACT

An electronic device, a gateway device, and signal transmission and reception methods thereof are provided. The electronic device includes a communication unit and a control unit. The communication unit is configured to transmit and to receive a signal to and from another communication entity. The control unit is configured to determine whether to activate a wireless local area network (WLAN), and to transmit information about activation or deactivation of the WLAN to a packet data network so as to maintain a created channel and authentication for data transmission and reception.

26 Claims, 12 Drawing Sheets

(51) Int. Cl.
  *H04W 88/06* (2009.01)
  *H04W 12/02* (2009.01)

(56) References Cited

U.S. PATENT DOCUMENTS

| | | | |
|---|---|---|---|
| 2008/0101291 A1* | 5/2008 | Jiang | H04L 63/08 370/331 |
| 2014/0086226 A1* | 3/2014 | Zhao | H04W 76/022 370/338 |
| 2015/0208309 A1* | 7/2015 | Taneja | H04W 36/0066 455/426.1 |
| 2015/0257066 A1* | 9/2015 | Salkintzis | H04W 12/06 455/442 |
| 2016/0073404 A1* | 3/2016 | Vutukuri | H04W 72/042 370/329 |

* cited by examiner

ELECTRONIC DEVICE AND METHOD FOR SIGNAL TRANSMISSION AND RECEPTION

CROSS-REFERENCE TO RELATED APPLICATION(S)

This application claims the benefit under 35 U.S.C. §119(a) of a Korean patent application filed on Oct. 24, 2014 in the Korean Intellectual Property Office and assigned Serial number 10-2014-0145566, the entire disclosure of which is hereby incorporated by reference.

TECHNICAL FIELD

The present disclosure relates to an electronic device, a gateway device, a method for transmitting and receiving a signal at the electronic device, and a method for transmitting and receiving a signal at the gateway device, which allow reductions in power consumption of electronic device and unnecessary network loads in mobile communication systems.

BACKGROUND

With the popularization of smart phones and tablet personal computers (PCs), users of mobile internet are increasing rapidly. According to recent statistical data and reports, it is estimated that mobile traffic will exceed desktop traffic in the near future. Moreover, it is feared that mobile bandwidth crunch in which a demand for mobile traffic exceeds the capacity of a mobile communication network will occur.

In order to solve this issue, many countries have put forth a multilateral effort into sharing frequencies and thereby securing additional frequencies. Additionally, the standardization of technologies for offloading mobile traffic by using high-speed wireless access technologies based on unlicensed frequency bands such as wireless fidelity (Wi-Fi) has been studied in 3rd Generation Partnership Project (3GPP) or the like.

However, in case of offloading cellular traffic to wireless networks such as Wi-Fi, this may increase undesirably the power consumption of devices and may also incur unnecessary network loads.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device, a gateway device, and signal transmission/reception methods thereof which can prevent power consumption and signaling overhead due to unnecessary attach/detach procedures by sharing a wireless local area network (WLAN) activation status of the electronic device between the electronic device and a packet data network gateway (PGW) in a mobile communication system.

In accordance with an aspect of the present disclosure, an electronic device for transmitting and receiving data in a mobile communication system is provided. The electronic device includes a communication unit configured to transmit and to receive a signal to and from another communication entity and a control unit configured to determine whether to activate a WLAN, and to transmit information about activation or deactivation of the WLAN to a packet data network so as to maintain a created channel and authentication for data transmission and reception.

In accordance with another aspect of the present disclosure, a gateway device for transmitting and receiving data in a mobile communication system is provided. The gateway device includes a communication unit configured to transmit and to receive a signal to and from another communication entity, and a control unit configured to select a communication network to transmit and receive data, depending on information about activation or deactivation of a WLAN by an electronic device, the information being received from the electronic device.

In accordance with another aspect of the present disclosure, a method for transmitting and receiving a signal at an electronic device in a mobile communication system is provided. The method includes determining whether to activate a WLAN and transmitting information about activation or deactivation of the WLAN to a packet data network so as to maintain a created channel and authentication for data transmission and reception.

In accordance with another aspect of the present disclosure, a method for transmitting and receiving a signal at a gateway device in a mobile communication system is provided. The method includes receiving information about activation or deactivation of a WLAN by an electronic device from the electronic device and selecting a communication network to transmit and receive data, depending on the received information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
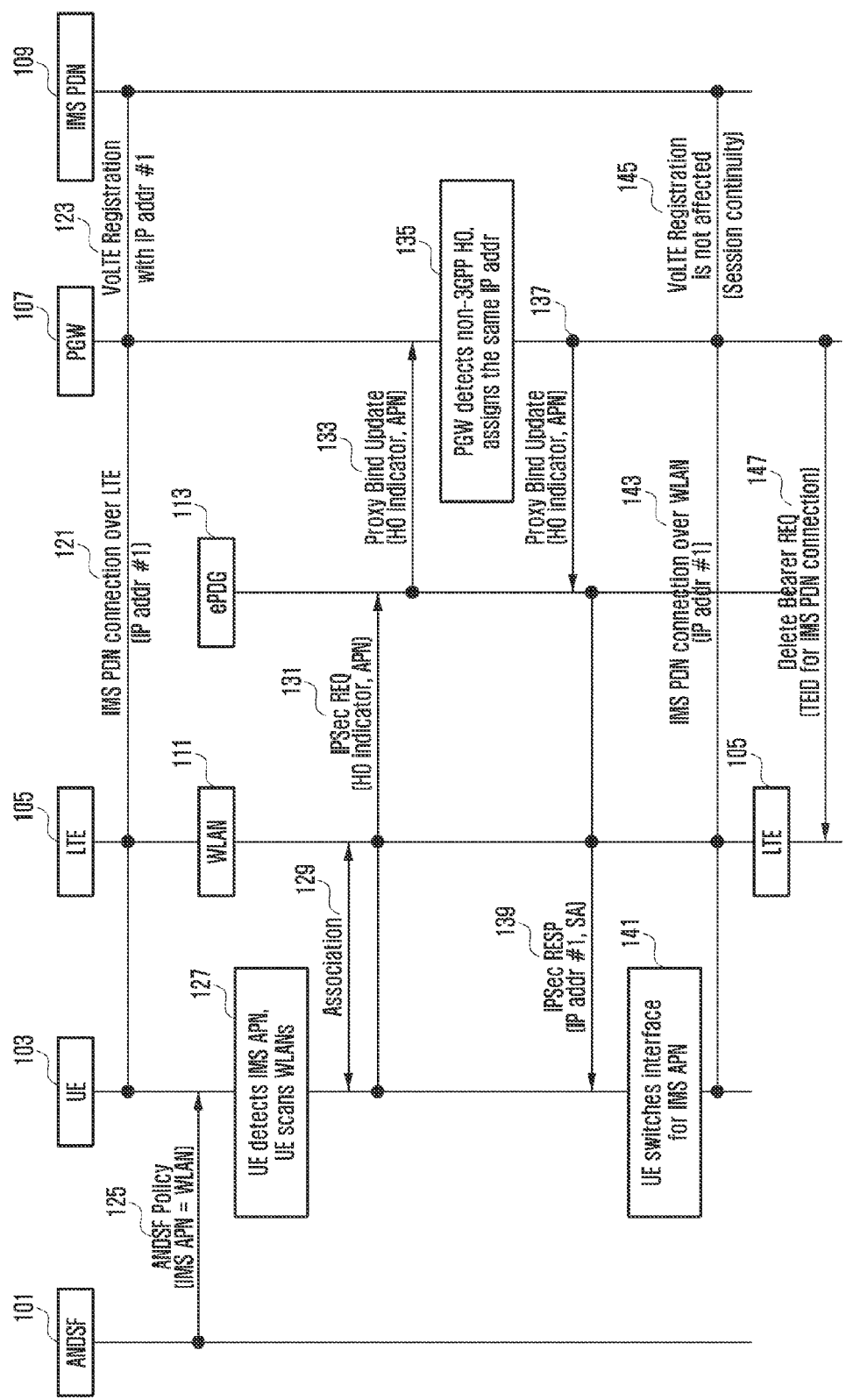
FIG. 1 is a diagram illustrating a signaling process in case of handover from a cellular network to a wireless local area network according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this disclosure, well known techniques may not be described or illustrated in detail to avoid obscuring the subject matter of the present disclosure. Through the drawings, the same or similar reference numerals denote corresponding features consistently. The terms used herein are only used to describe specific various embodiments, and are not intended to limit the present disclosure. As used herein, the singular forms are intended to include the plural forms as well, unless the context clearly indicates otherwise.

The term "unit" or "module", as used herein, may refer to a software or hardware component or device which performs certain tasks. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Although embodiments of the present disclosure will be described hereinafter by mainly targeting a 3rd Generation Partnership Project (3GPP) long term evolution (LTE) system and a wireless local area network (WLAN) which is one of non-3GPP access networks and popularly known as wireless fidelity (Wi-Fi) communication systems, the essential concept of the present disclosure may be favorably applied to any other communication system having similar technical background and system form without departing from the scope of the present disclosure as will be understood by those skilled in the art.

For example, this disclosure may be applied to the 1×/CDMA200 system or the WiMAX system instead of WLAN.

Currently user equipment (UE) of a mobile communication system may use a cellular network and a Wi-Fi network at the same time. However, since the cellular system and the Wi-Fi system operate with independent IP addresses, seamless offloading is not easy between the cellular network and the Wi-Fi network. Also, since there is no interworking structure between the cellular and Wi-Fi networks, some additional infrastructures for operator server access and cellular network authentication are needed to receive a service of the cellular network through the Wi-Fi network, such as IP multimedia subsystem (IMS) or multimedia message service (MMS). And also, even though such infrastructures are supported, seamless handover between both networks is not easy to support.

Therefore, the standardization associated with cellular and Wi-Fi interworking is in progress for Wi-Fi offloading of cellular traffic in 3GPP standards, and the commercialization is also in progress by some operators. In a cellular and Wi-Fi network interworking structure being standardized, seamless handover between networks may be possible by sharing a single IP address. Additionally, it is possible for UE to access packet data network gateway (PGW) of the cellular network through the Wi-Fi network. Further, by allowing the authentication of the cellular network through a 3GPP (authorization, authentication and accounting (AAA) module), UE may be offered a cellular service such as IMS or MMS through the Wi-Fi network. For this, as an interworking system between 3GPP access network and non-3GPP access network for supporting internet protocol (IP) mobility, the 3GPP standards have proposed new interfaces such as S2a, S2b, S3c, etc. and evolved packet data gateway (ePDG) for authentication and security in untrusted non-3GPP network.

In 3GPP Release 8, access network discovery and selection function (ANDSF) has been defined as an entity of evolved packet core (EPC) in 3GPP. This provides a network discovery function that allows UE to find non-3GPP access network, and inter-system mobility protocol (ISMP) that defines a rule and priority for offloading between 3GPP access network and non-3GPP access network. However, interworking offered in Release 8 requires that all public land mobile networks (PLMNs) have to share ISMP, and UE can use services through only one of a 3GPP access network and a non-3GPP access network. Namely, UE can use services through only one of a cellular network and a Wi-Fi network.

3 GPP Release 9 has been improved to add ISMP to each PLMN. However, UE can still use only one access network of cellular and Wi-Fi networks.

In 3GPP Release 10, multiple access connectivity (MAPCON) and IP flow mobility (IFOM) have been suggested, thereby allowing data transmission/reception simultaneously using a 3GPP access network and a non-3GPP access network. In case of MAPCON, offloading between networks is possible for each public data network (PDN) connection. In case of IFOM, offloading between networks is possible even in the same PDN connection according to detailed filter conditions. For example, in case of IFOM, offloading between networks is possible for each IP flow. Also, 3GPP Release 10 supports non-seamless WLAN offloading for offloading through non-3GPP access network. For supporting the above functions, the ANDSF has added inter-system routing policy (ISRP). Additionally, operation using general packet radio service (GPRS) tunneling protocol (GTP) as well as the existing proxy mobile IP (PMIP) has been added to S2b.

In 3GPP Release 11, relevant contents have been added to IP traffic filter of ANDSF to allow offloading between networks according to an application ID and a domain name in 3GPP access network and non-3GPP access network. Additionally, operation using GTP as well as the existing PMIP has been added to S2a. Further, in 3GPP Release 11, broadband access interworking (BBAI) for securing end-to-end Quality of Service (QoS) in wired/wireless integrated network has been added.

In 3GPP Release 12, a study about enhanced S2a mobility (eSaMOB) over trusted WLAN access to EPC item is in progress for supporting both non-seamless offloading and session continuity by using a GTP-based S2a interface in a trusted WLAN. Also, an item named WORM (optimized offloading to WLAN in 3GPP RAT mobility) for upgrading ANDSF is being discussed to differently apply offloading policies of WLAN depending on radio access technology (RAT) of 3GPP.

Hereinafter, embodiments of the present disclosure will be described with reference to the accompanying drawings. In this disclosure, an electronic device will be used as the same meaning as UE. Also, a gateway device may include a PGW or a PGW server in the mobile communication system.

FIG. 1 is a diagram illustrating a signaling process in case of handover from a cellular network to a wireless local area network according to an embodiment of the present disclosure.

Referring to FIG. 1, at operation 121, UE 103 may be connected to PGW 107 through an LTE network 105. Also, the UE 103 may be connected to internet protocol multimedia subsystem public data network (IMS PDN) 109 through the LTE network 105 and the PGW 107. In this case, the first IP address (IP addr #1) may be assigned regarding the LTE network 105.

At operation 123, the PGW 107 may be connected to the IMS PDN 109. The PGW 107 may register voice over LTE (VoLTE) in the IMS PDN 109. At this time, VoLTE registration may be performed using the first IP address.

At operation 125, an access network discovery and selection function (ANDSF) 101 may transmit policy information to the UE 103. The ANDSF 101 may be an entity for offering technology about handover between different devices. The ANDSF 101 and the UE 103 may transmit and receive signals to and from each other. The ANDSF 101 may collect and store in advance information about each network and operator's policy information and may offer the collected information to the UE 103 in response to a request of the UE 103.

According to an embodiment, policy information may include at least one of information for access network selection/search and information for traffic routing determination. Information offered to the UE 103 may be referred to as an ANDSF policy or an ANDSF rule. The policy information may include one or more of ICM applicable to the UE 103 and information indicating whether NW-initiated IP flow mobility is used or not. According to an embodiment, the policy information may be set differently depending on each individual access point name (APN). The policy information may be contained in WLAN selection policy, inter-system mobility policy, inter-system routing policy, inter-APN routing policy, or IP flow mobility policy. The ANDSF 101 may transmit, to the UE 103, information that instructs the UE 103 to change IMS APN to WLAN 111.

At operation 127, the UE 103 may detect IMS APN. Also, the UE 103 may scan the WLAN 111.

At operation 129, the UE 103 may perform an association with the WLAN 111.

At operation 131, the UE 103 may transmit an IP security protocol request (IPSec REQ) to an evolved packet data gateway (ePDG) 113. The IPSec REQ may contain a handover (HO) indicator and/or APN information.

At operation 133, the ePDG 113 may transmit a proxy binding update message. This message may also contain the HO indicator and/or APN information.

At operation 135, the PGW 107 may detect a handover to a non-3GPP network. The PGW 107 may assign the same IP address as used in the 3GPP network.

At operation 137, the PGW 107 may transmit a proxy binding acknowledge (Ack) message to the ePDG 113. The binding Ack message may contain the first IP address information. The ePDG 113 may be a separate node for security, QoS mapping, or the like. In order to render an untrusted access network to be trusted, the ePDG 113 may perform authentication and create a tunnel between the UE 103 and the ePDG 113. Then the UE 103 may be connected to the PGW 107 through the ePDG 113.

At operation 139, the ePDG 113 may transmit an IPSec response (RESP) to the UE 103. The IPSec RESP may contain the first IP address and/or security association (SA) related information.

At operation 141, the UE 103 may switch a communication interface to an IMS APN (e.g., WLAN) interface.

At operation 143, the UE 103 may be connected to the IMS PDN 109 through the WLAN 111. For example, using the same IP address (i.e., the first IP address) as used previously in the LTE network 105, the UE 103 may be connected to the IMS PDN 109 through the WLAN 111.

At operation 145, VoLTE registration between the PGW 107 and the IMS PDN 109 may be not affected. Namely, even in case of handover of the UE 103, the session continuity may be maintained.

At operation 147, the PGW 107 may transmit a bearer delete request to the LTE network 105. The bearer delete request may contain tunneling endpoint identifier (TEID) for IMS PDN connection. Namely, the PGW 107 may delete a connection path with the UE 103 through the LTE network 105.

According to an embodiment, through the above steps, the UE 103 may perform handover from the LTE network 105 to the WLAN 111.

Figure 2:
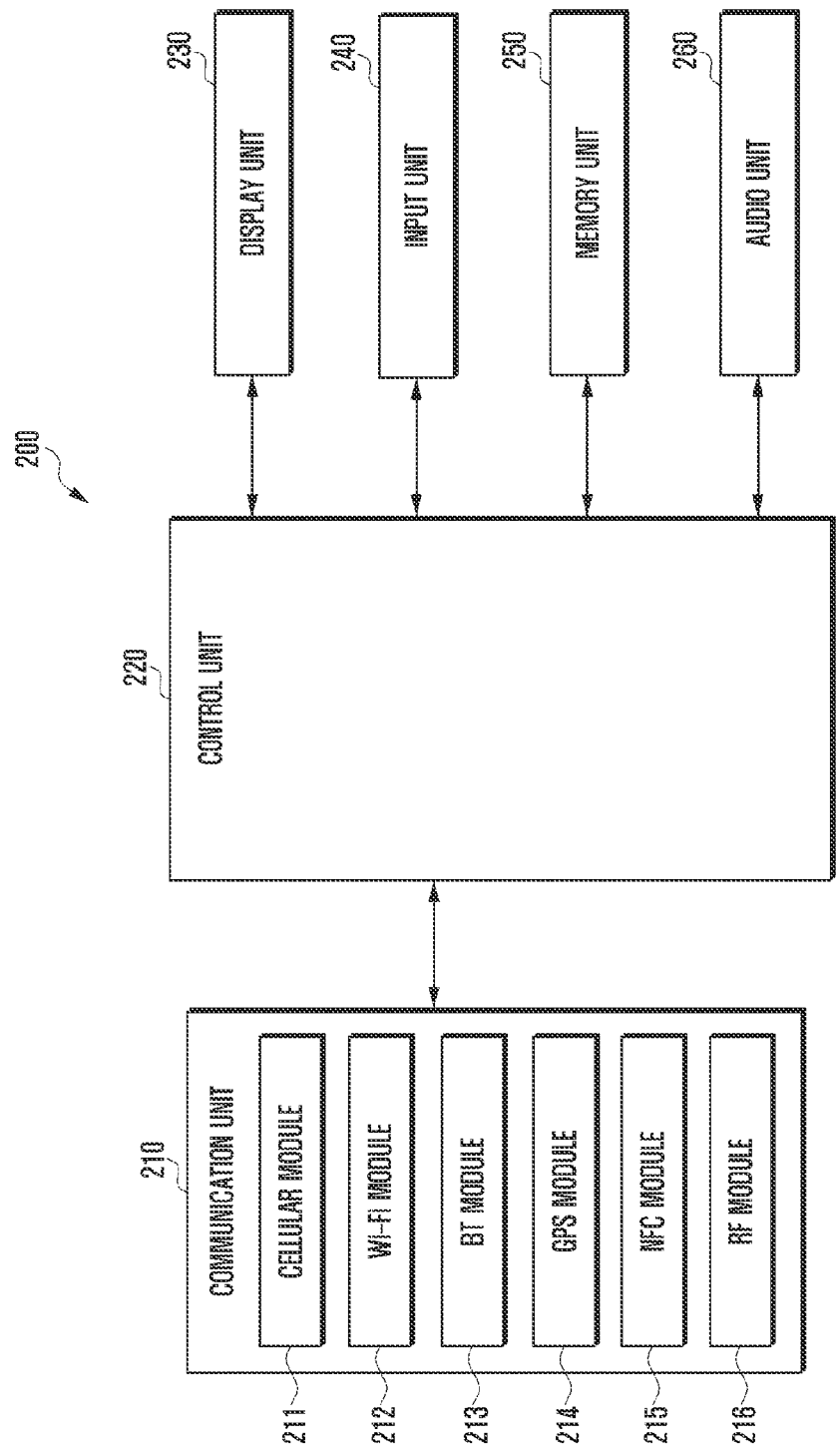
FIG. 2 is a block diagram illustrating an electronic device according to an embodiment of the present disclosure.

FIG. 2 is a block diagram illustrating an electronic device according to an embodiment of the present disclosure.

Referring to FIG. 2, the electronic device 200 may include a communication unit 210, a control unit 220, a display unit 230, an input unit 240, a memory unit 250, and an audio unit 260.

The communication unit 210 may perform data transmission and reception in communication between the electronic device 200 and other electronic devices (e.g., an external electronic device, a server, or any other entity in the mobile communication network). According to an embodiment, the communication unit 210 may include a cellular module 211, a Wi-Fi module 212, a bluetooth (BT) module 213, a global positioning system (GPS) module 214, or a near field communication (NFC) module 215, and a radio frequency (RF) module 216.

The cellular module 211 may provide a voice call, a video call, a messaging service, an internet service, and the like through a suitable communication network (e.g., LTE, LTE-A, CDMA, WCDMA, UMTS, WiBro, GSM, etc.). The cellular module 211 may perform identification and authentication of the electronic device 200 in the communication network by using a subscriber identification module (SIM) card. According to an embodiment, the cellular module 211 may perform at least part of functions the control unit 220 can offer. For example, the cellular module 211 may perform at least part of a multimedia control function.

According to an embodiment, the cellular module 211 may include a communication processor (CP). The cellular module 211 may be implemented by, for example, a system on chip (SoC). According to an embodiment, the control unit 220 may include at least some (e.g., the cellular module) of the above-listed modules.

According to an embodiment, the control unit 220 or the cellular module 211 (e.g., the CP) may load a command or data, received from at least one of a nonvolatile memory or any other element connected thereto, to a volatile memory and process it. Also, the control unit 220 or the cellular module 211 may store, in a nonvolatile memory, data received from at least one of other elements or created by at least one of other elements.

Each of the Wi-Fi module 212, the BT module 213, the GPS module 214, and the NFC module 215 may include therein a processor for processing data received or to be transmitted therethrough. Although in FIG. 2 each of the cellular module 211, the Wi-Fi module 212, the BT module 213, the GPS module 214, and the NFC module 215 is shown as a separate individual module, at least some of them may be contained in a single integrated circuit (IC) chip or package. For example, at least part of processors each of which corresponds to each of the cellular module 211, the Wi-Fi module 212, the BT module 213, the GPS module 214, and the NFC module 215 (e.g., a communication processor corresponding to the cellular module 211 and a Wi-Fi processor corresponding to the Wi-Fi module 212) may be implemented by means of a single SoC.

The RF module 216 may be used for transmission and reception of data, for example, transmission and reception of RF signals. Although not illustrated, the RF module 216 may include, for example, a transceiver, a power amplifier module (PAM), a frequency filter, a low noise amplifier (LNA), and/or the like. In addition, the RF module 216 may further include a component, e.g., a conductor, a conductive wire, etc., for transmitting and receiving electromagnetic waves in a free space in radio communication. The cellular module 211, the Wi-Fi module 212, the BT module 213, the GPS module 214, and the NFC module 215 may share the single RF module 216 with each other. According to an embodiment, at least one of them may perform transmission and reception of RF signals through separate RF modules.

According to an embodiment, the communication unit 210 may transmit and receive a signal to and from other communication entity (e.g., PGW, ePDG, ANDSF, etc.) in the mobile communication system under the control of the control unit 220. For example, the communication unit 210 may receive a communication policy (e.g., an offloading rule, an offloading priority, an ANDSF rule, an ANDSF policy, etc.) from the ANDSF.

According to an embodiment, the communication unit 210 may receive, from a packet data network (e.g., the PGW) through a cellular network, a part of data transmitted by another communication entity or a notification message that indicates the reception of data from other communication entity.

The control unit 220 may control several hardware or software elements (e.g., the communication unit 210, the display unit 230, the input unit 240, the memory unit 250, etc.) connected thereto by executing an operating system (OS) or an application program, and also perform processing and arithmetic operations on various data including multimedia data. The control unit 220 may be implemented by means of, for example, a SoC. According to an embodiment, the control unit 220 may further include a graphical processing unit (GPU). According to an embodiment, the control unit 220 may be an application processor (AP) or a CP. According to an embodiment, the control unit 220 may receive commands from other elements through a bus, interpret the received commands, and execute calculation or data processing according to the interpreted commands.

According to an embodiment, when the electronic device 200 transmits or receives specific data, the control unit 220 may select a communication network to be used for such transmission or reception of specific data. For example, depending on data to be transmitted or received, the control unit 220 may select whether to perform communication through the LTE network or through the WLAN. According to an embodiment, the control unit 220 may perform offloading to the WLAN while transmitting and receiving data through the cellular network.

According to an embodiment, based on fields (e.g., an IP flow, an application identifier (ID), a domain name, etc.) defined in 3GPP, the control unit 220 may select a communication network to transmit and receive data. According to an embodiment, based on a communication policy (e.g., an ANDSF rule or an ANDSF policy) received from the ANSDF, the control unit 220 may select a communication network to transmit and receive data or perform offloading from a 3GPP network (e.g., the cellular network) to a non-3GPP network (e.g., the WLAN). According to an embodiment, based on at least one of a data transmission throughput, a content type, and a content capacity as well as fields defined in 3GPP, the control unit 220 may select a communication network to transmit and receive data. For example, the control unit 220 may select a communication network for each content (data) type according to predefined criteria and also, depending on the throughput of each communication network, select or change a communication network to transmit and receive data.

According to an embodiment, the control unit 220 may determine whether to activate or deactivate the WLAN (e.g., Wi-Fi). According to various embodiments of this disclosure, a deactivated state of WLAN refers to a state where a WLAN or Wi-Fi function of the electronic device 200 (or UE) is turned off without detachment between the electronic device 200 and the network. Namely, a deactivated state of WLAN may be a state of restricting data transmission and reception of the electronic device 200 through the WLAN while maintaining a communication channel or tunnel established between the electronic device and the packet data network (e.g., PGW) and also maintaining authentication for data transmission and reception therebetween. Hereinafter, such a deactivated state of WLAN may be referred to as a sleep state.

According to an embodiment, the control unit 220 may change an activated state of WLAN by determining whether data received from the packet data network (e.g., PGW) is data to be transmitted using the WLAN. According to an embodiment, based on either an independent policy of the electronic device 200 or a policy (e.g., an ANDSF rule or an ANDSF policy) received from the ANSDF, the control unit 220 may determine a communication network (e.g., a network interface) to transmit data. If a communication policy instructs the transmission of data through the cellular network, the control unit 220 may transmit data to the packet data network (e.g., PGW) through the cellular interface. If a communication policy instructs the transmission of data through the WLAN, the control unit 220 may activate the WLAN and then transmit data to the packet data network (e.g., PGW) through the WLAN.

According to an embodiment, if an offloading operation of the electronic device 200 is determined depending on an application ID, the control unit 220 may deactivate the WLAN in response to the termination of an application using the WLAN.

According to an embodiment, using a timer synchronized with the packet data network (e.g., PGW), the control unit 220 may deactivate the WLAN when there is neither transmission nor reception of data through the WLAN during a predetermined time. For example, the control unit 220 may deactivate the WLAN when there is no data traffic during a predetermined time. This data traffic is what is defined to be received through the WLAN (e.g., Wi-Fi) according to a communication policy or any other criterion.

According to an embodiment, when the processor (e.g., the control unit 220 or the AP) of the electronic device 200 is turned off, the control unit 220 may deactivate the WLAN.

According to an embodiment, when it is determined that power consumption of the electronic device 200 is greater than a predetermined value, the control unit 220 may deactivate the WLAN so as to reduce power consumption.

According to an embodiment, in response to a user input received through the input unit 240, the control unit 220 may activate or deactivate the WLAN.

According to an embodiment, the control unit 220 may activate the WLAN when a part of data transmitted by other communication entity or a notification message indicating the reception of data from other communication entity is received from the packet data network (e.g., PGW) through the cellular network. In this case, after activating the WLAN, the control unit 220 may create a WLAN wakeup signal to be transmitted to the packet data network.

The control unit 220 may transmit, to the packet data network (e.g., PGW), information about whether the WLAN is activated. For example, if Wi-Fi of the electronic device 200 is activated, the control unit 220 may notify the packet data network that Wi-Fi is activated. Similarly, if Wi-Fi of the electronic device 200 is deactivated, the control unit 220 may notify the packet data network that Wi-Fi is deactivated. According to an embodiment, the above information about whether the WLAN is activated may be WLAN sleep information which indicates that the electronic device is in a sleep state of deactivating the WLAN while maintaining a channel with the packet data network.

According to an embodiment, the control unit 220 may add information about activation or deactivation of the WLAN to a binding update message and then transmit the message to the packet data network. For example, the electronic device 200 may add information about a WLAN activation status to a binding message defined in 3GPP and then send the binding message to the packet data network.

According to an embodiment, by using reserved bits of the binding update message, the electronic device 200 may add information about the WLAN is activated or deactivated.

According to an embodiment, by setting a specific value prearranged with the packet data network in a lifetime field of the binding update message, the electronic device 200 may add information indicating whether the WLAN is activated or deactivated.

According to an embodiment, the electronic device 200 may define a new mobility option for power optimization in the binding update message and then, by using a mobility option field, add information indicating whether the WLAN is activated or deactivated.

According to an embodiment, the control unit 220 may add information about activation or deactivation of the WLAN to a protocol configuration option (PCO) field of a non-access stratum (NAS) message and then transmit the NAS message to the packet data network. For example, the control unit 220 may transmit the NAS message through the cellular network.

According to an embodiment, when the WLAN which is in a deactivated state is activated, the control unit 220 may transmit a message for indicating activation of the WLAN to the packet data network through the WLAN. For example, when the WLAN is activated, the control unit 220 may transmit a WLAN wakeup signal to the packet data network and thereby notify the fact that transmission and reception of data is allowed through the WLAN (namely, a communication channel or tunnel created between the electronic device and the packet data network). For example, when the WLAN is activated, the control unit 220 may transmit a certain message through the WLAN. Additionally, the control unit 220 may transmit data defined by a communication policy through the WLAN. Namely, by transmitting a certain signal or data through the WLAN, the control unit 220 may notify the packet data network (e.g., PGW) that the WLAN is activated.

According to an embodiment, depending on a user input or whether a specific situation or condition is satisfied, the control unit 220 may establish that a signal should be transmitted to or received from other communication entity through only the WLAN.

The display unit 230 may display various screens (e.g., a media content playback screen, a call dialing screen, a messenger screen, a game screen, a gallery screen, etc.) associated with the operation of the electronic device 200.

Additionally, the display unit 230 may display (i.e., visually outputs) information processed in the electronic device 200. When the electronic device 200 is in a call mode, for example, the display unit 230 may display a user interface (UI) or a graphic UI (GUI) in connection with the call mode. Similarly, when the electronic device 200 is in a video call mode or a camera mode, the display unit 230 may display a received and/or captured image, UI or GUI. Also, depending on a rotation direction (or a placed direction) of the electronic device 200, the display unit 230 may change a screen display between a landscape mode and a portrait mode.

The display unit 230 may be formed of liquid crystal display (LCD), thin film transistor-LCD (TFT-LCD), light emitting diode (LED), organic LED (OLED), active matrix OLED (AMOLED), flexible display, bended display, or 3D display. Some of such displays may be realized as a transparent display.

The input unit 240 may receive a user's input for manipulating the electronic device 200. Also, the input unit 240 may receive a user's touch input. The input unit 240 may include a touch panel which may recognize a touch input in at least one of, for example, a capacitive scheme, a resistive scheme, an infrared scheme, an acoustic wave scheme, and the like. In addition, the touch panel may have a control circuit. In case of the capacitive type, the touch panel is capable of recognizing proximity as well as a direct touch. The touch panel may further include a tactile layer. In this event, the touch panel may provide a tactile response to the user. The input unit 240 may transmit an input signal, caused by a received touch input, to the control unit 220.

The input unit 240 may include a digital pen sensor, a key, or an ultrasonic input unit. The digital pen sensor may be implemented by using a method identical or similar to a method of receiving a touch input from the user, or by using a separate sheet for recognition. The key may include, for example, a mechanical button, an optical key, or a keypad. The ultrasonic input unit enables the electronic device 200 to detect a sound wave through an input tool generating an ultrasonic signal and also to identify data. The ultrasonic input unit is capable of wireless recognition.

According to an embodiment, the input unit 240 may receive a user's input for activating or deactivating the WLAN. For example, the input unit 240 may receive a user's input for activating or deactivating the communication unit 210 (e.g., the Wi-Fi module).

According to various embodiments of the present disclosure, the display unit 230 and the input unit 240 may be an integrated form. For example, the electronic device 200 may include a touch screen which can perform both an input function and a display function. The touch screen may be structured in a stack of a touch panel and a display panel. The touch screen may sense a user's touch event (e.g., a long press input, a short press input, a single-touch input, a multi-touch input, a touch-based gesture input such as a drag input, etc.) from the surface thereof. When such a touch event is sensed from the surface of the touch screen, the touch screen may detect coordinates of the sensed touch event and transmit a signal of the detected coordinates to the control unit 220.

The touch screen may be configured to convert a change in pressure applied to a specific point of the surface or in capacitance generated at such a specific point into an electric input signal. Also, the touch screen may be configured to detect a touch pressure as well as a touch position and a touch area. When there is a touch input on the touch screen, corresponding signals may be transmitted to a touch controller. Then the touch controller may process the received signals and deliver corresponding data to the control unit 220.

The memory unit 250 may store audio data, image data, data received from a camera, data for processing, algorithms used for the operation of the electronic device 200, setting data, guide information, and the like. Also, the memory unit 250 may temporarily store processed results.

The memory unit 250 may include a volatile memory and/or a nonvolatile memory. For example, the volatile memory may include an random access memory (RAM), an static RAM (SRAM), a dynamic RAM (DRAM), etc., and the nonvolatile memory may include a read only memory (ROM), a flash memory, a hard disk, an secure digital (SD) memory card, an multi media card (MMC), etc.

The memory unit 250 may store commands or data received from or created by the control unit 220 or other elements (e.g., the communication unit 210, the display unit 230, the input unit 240, etc.). The memory unit 250 may include programming modules such as a kernel, a middleware, an application programming interface (API), an application, and/or the like. Each of the programming modules may be implemented in software, firmware, hardware, or a combination of two or more thereof.

The kernel may control or manage system resources (e.g., a bus, the control unit 220, the input unit 240, etc.) used to execute operations or functions implemented in other programming modules (e.g., the middleware, the API, or the application). Also, the kernel may offer an interface capable of accessing and then controlling or managing individual elements of the electronic device 200 by using the middleware, the API, or the application.

The middleware may allow the API or the application to communicate with the kernel and to exchange data therewith. Additionally, in connection with task requests received from the application, the middleware may perform a control (e.g., scheduling or load balancing) for the task requests by, for example, assigning at least one application a priority for using system resources (e.g., the bus, the control unit 220, or the input unit 240) of the electronic device 200.

The API is an interface through which the application controls a function offered by the kernel or the middleware, and may include, for example, at least one interface or function (e.g., commands) for a file control, a window control, an image processing, a text control, and/or the like.

According to an embodiment, the memory unit 250 may store information received from an external electronic device, a server, or any other communication entity (e.g., ANDSF). For example, the memory unit 250 may store a communication policy (e.g., an ANDSF policy, etc.) received from the ANDSF.

The audio unit 260 may convert a voice into an electric signal, and vice versa. The audio unit 260 may include at least one of a speaker, a receiver, an earphone, and a microphone, and may convert input or output voice data.

Figure 3:
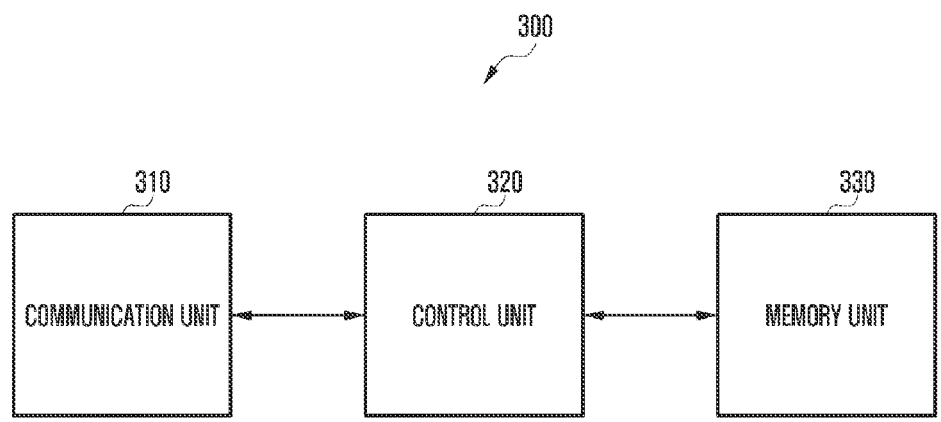
FIG. 3 is a block diagram illustrating a gateway device according to an embodiment of the present disclosure.

FIG. 3 is a block diagram illustrating a gateway device according to an embodiment of the present disclosure.

Referring to FIG. 3, the gateway device 300 may include a communication unit 310, a control unit 320, and a memory unit 330. According to an embodiment, the gateway device 300 may be a PGW of the mobile communication system.

The communication unit 310 may transmit and receive a signal to and from any other communication entity. For example, the communication unit 310 may transmit and receive a signal to and from the electronic device 200 (UE, ePDG, etc.) Also, the communication unit 310 may transmit and receive a signal to and from the electronic device 200 through the cellular network (e.g., the LTE network) or the WLAN (or Wi-Fi). And also, the communication unit 310 may transmit and receive data to and from an external network (e.g., a PDN, etc.).

According to an embodiment, the communication unit 310 may receive, from the electronic device 200, information about whether the WLAN is activated or deactivated.

The control unit 320 may select a communication network to transmit and receive data, depending on information, received from the electronic device 200, about whether the electronic device 200 activates or deactivates the WLAN (or Wi-Fi). In case the electronic device 200 activates the WLAN, the control unit 320 may control the communication unit 310 to transmit and receive signals or data to and from the electronic device 200 through the WLAN. In case the electronic device 200 deactivates the WLAN, the control unit 320 may control the communication unit 310 to transmit and receive signals or data to and from the electronic device 200 through the cellular network (e.g., the LTE network).

According to an embodiment, using a timer synchronized with the electronic device 200, if there is neither transmission nor reception of data through the WLAN during a predetermined time, the control unit 320 may determine that the electronic device 200 deactivates the WLAN. Then the control unit 320 may update the WLAN activation information stored in the memory unit 330.

TABLE 1

Example of binding cache of the gateway device 300

| Home Address | Routing Address | Binding ID | BID Priority | Flow ID | FID Priority | Routing Filter | Wi-Fi Status |
|---|---|---|---|---|---|---|---|
| HoA 1 | CoA 1 | BID 1 | x | FID 1 | A | Description of IP Flows | Y |
|  |  |  |  | FID 2 | B | Description of IP Flows |  |
| HoA 2 | CoA 2 | BID 2 | y | FID 3 |  |  | N |

Referring to Table 1, the binding cache of the gateway device 300 (e.g., PGW) according to an embodiment of the present disclosure may include a home address, a routing address, a binding ID, a BID priority, a flow ID, an FID priority, routing filter information, and WLAN (e.g., Wi-Fi) status information. Particularly, this binding cache of the gateway device 300 may further include a field for indicating a WLAN (e.g., Wi-Fi) activation status of the electronic device 200 in addition to fields of normal binding cache.

Hereinafter, it is supposed that, in Table 1, BID 1 represents a WLAN (e.g., Wi-Fi) path and BID 2 represents a cellular communication (e.g., LTE network) path.

According to an embodiment, when data is received through a cellular network of the electronic device 200, the control unit 320 may change a source address of the received data to a home address, i.e., HoA 2, and then transmit the received data to the PDN. A home address may be a global address which can be recognized from the outside of interworking network. Namely, using this home address, the PDN may perform a communication with the same address even though the electronic device 200 transmits data through either cellular or Wi-Fi interface.

If data is received through a Wi-Fi interface of the electronic device 200, the control unit 320 may update a WLAN status (e.g., a Wi-Fi status) of the binding cache. Namely, when data is received from the electronic device 200 through the WLAN, the control unit 320 may change the WLAN status information, stored in the binding cache, from deactivation to activation. However, if the WLAN status information of the binding cache is activation, this information stored in the binding cache may be maintained without update. Thereafter, the control unit 320 may change a source address of data to HoA 1 and then transmit the data to the PDN.

In case downstream data is received, the control unit 320 may check, through a filter of the binding cache, whether such data should be transmitted through the cellular interface or the WLAN (Wi-Fi) interface of the electronic device 200. If it is required to transmit data through the cellular interface, the control unit 320 may change the destination address of data packet to relevant care of address (CoA), i.e., CoA 2, and then transmit the data packet to the cellular network. If it is required to transmit data through the WLAN, the control unit 320 may check whether the WLAN is activated in the binding cache. In case the WLAN is activated, the control unit 320 may change the destination address of data packet to CoA 1 and then transmit the data packet to the WLAN. In case the WLAN is deactivated, the control unit 320 may send a signal for activating the WLAN to the electronic device 200 so as to activate the WLAN. Then the control unit 320 may change the destination address of data packet to CoA 1 and transmit the data packet to the WLAN.

If a BID path is in a sleep state, namely if the WLAN is in a deactivated state, the control unit 320 may consider the deactivated state of the WLAN without deleting relevant path information. For example, the control unit 320 may not perform the IP-CAN session modification procedure and the GW control session and QoS rules provision procedure used when deleting a path by detaching the electronic device 200. Therefore, embodiments of the present disclosure may reduce signaling overhead between the electronic device 200 and the gateway device 300 (e.g., PGW).

According to an embodiment, in case of data transmitted from any address which is not contained in the binding cache, the control unit 320 may perform a separate process. For example, depending on type, capacity, etc. of individual data, the control unit 320 may select a network to transmit the data.

According to an embodiment, if there is neither transmission nor reception of data through the WLAN during a predetermined time, the control unit 320 may determine, using a timer synchronized with the electronic device 200, that the electronic device 200 deactivates the WLAN. For example, each of the electronic device 200 and the gateway device 300 may include a synchronized timer. Namely, when it is detected using the synchronized timer that there is no data transmission through the WLAN during a given time, the electronic device 200 such as UE may deactivate the WLAN. Also, the gateway device 300 such as PGW may recognize the deactivation of the WLAN and then update the WLAN status information (e.g., a specific field of the binding cache) stored in the memory unit 330. Therefore, even though transmitting and receiving no signal to and from each other, the electronic device 200 and the gateway device 300 may share information about a status of the WLAN.

According to an embodiment, in case of receiving data from any other external communication entity, the control unit 320 may transmit all or part of the received data to the electronic device 200 through the cellular network. Additionally, in this case, the control unit 320 may create a notification message for notifying the electronic device 200 that data is received, and then transmit the notification message to the electronic device 200.

The memory unit 330 may store information about whether the electronic device 200 activates or deactivates the WLAN. Also, the memory unit 330 may store the binding cache, which may contain a field for checking whether the electronic device 200 activates or deactivates the WLAN.

According to an embodiment, the memory unit 330 may also store, separately from the binding cache, information indicating a WLAN activation status of the electronic device 200.

When the electronic device 200 deactivates the WLAN (or Wi-Fi) for the purpose of reducing power consumption or for any other reason, entities such as the PGW of the mobile communication system or network are not aware that the WLAN is deactivated. In this case, the PGW may perform autonomously a detach procedure. Namely, for a communication through the WLAN, the electronic device 200 may have to newly perform an attach procedure. Unfortunately, this may cause unnecessary signaling overhead and power consumption. However, according to various embodiments of the present disclosure, the electronic device 200 notifies the deactivation of the WLAN to the network (e.g., PGW), thereby reducing signaling overhead due to unnecessary attach/detach procedures and also minimizing power consumption of the electronic device 200.

Figure 4:
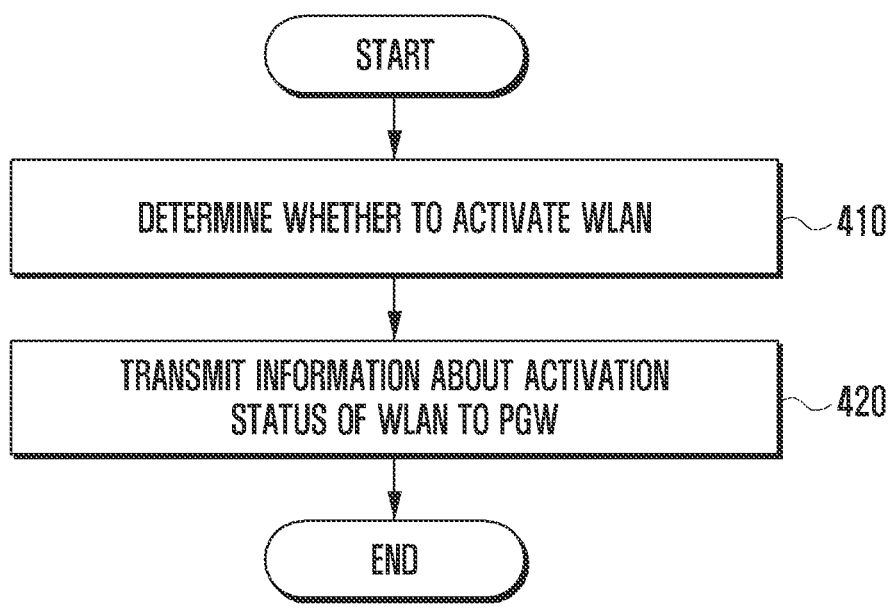
FIG. 4 is a flow diagram illustrating the operation of an electronic device according to an embodiment of the present disclosure.

FIG. 4 is a flow diagram illustrating the operation of an electronic device according to an embodiment of the present disclosure.

At operation 410, the electronic device 200 may determine whether to activate the WLAN (or Wi-Fi). For example, depending on data to be transmitted, a communication policy, or a specific situation, the electronic device 200 may determine whether to activate or deactivate the WLAN or Wi-Fi.

According to an embodiment, the electronic device 200 may change the activation or deactivation of the WLAN by determining whether data received from the packet data network (e.g., PGW) is data to be transmitted using the WLAN. According to an embodiment, if a communication network to transmit data is determined as the WLAN, based on either an independent policy of the electronic device 200 or a policy received from the ANSDF, the electronic device 200 may activate the WLAN. According to an embodiment, if an offloading operation of the electronic device 200 is determined depending on an application ID, the electronic device 200 may deactivate the WLAN in response to the termination of an application using the WLAN. According to an embodiment, using a timer synchronized with the packet data network (e.g., PGW), the electronic device 200 may deactivate the WLAN when there is neither transmission nor reception of data through the WLAN during a predetermined time. According to an embodiment, when the processor (e.g., the control unit 220 or the AP) of the electronic device 200 is turned off, the electronic device 200 may deactivate the WLAN. According to an embodiment, when it is determined that power consumption of the electronic device 200 is greater than a predetermined value, the electronic device 200 may deactivate the WLAN so as to reduce power consumption. According to an embodiment, in response to an input received from the user, the electronic device 200 may activate or deactivate the WLAN.

At operation 420, the electronic device 200 may transmit, to the packet data network (e.g., PGW), information about an activation status of the WLAN. According to an embodiment, the above information about an activation status of the WLAN may be WLAN sleep information. Namely, when the WLAN is deactivated, the electronic device 200 may set autonomously no use of the WLAN while maintaining a communication channel established earlier with the packet data network (e.g., PGW). Namely, the deactivation of the WLAN may be a shift to a sleep state without releasing a connection between the electronic device 200 and the packet data network. For example, if the WLAN is activated, the electronic device 200 may notify the activation of the WLAN to the packet data network (e.g., PGW). Similarly, if the Wi-Fi is deactivated, the electronic device 200 may notify the deactivation of the Wi-Fi to the packet data network (e.g., PGW).

According to an embodiment, the electronic device 200 may add information about an activation status of the WLAN to a binding update message defined in 3GPP and then transmit the message to the packet data network. For example, by using reserved bits of the binding update message, the electronic device 200 may add information about the WLAN is activated or deactivated. Also, by setting a specific value prearranged with the packet data network in a lifetime field of the binding update message, the electronic device 200 may add information indicating whether the WLAN is activated or deactivated. And also, the electronic device 200 may define a new mobility option for power optimization in the binding update message and then, by using a mobility option field, add information indicating whether the WLAN is activated or deactivated.

According to an embodiment, the electronic device 200 may add information about activation or deactivation of the WLAN to a PCO field of a NAS message and then transmit the NAS message to the packet data network. For example, the control unit 220 may transmit the NAS message through the cellular network.

According to an embodiment, when the WLAN which is in a deactivated state is activated, the electronic device 200 may transmit a message for indicating the activation or deactivation of the WLAN to the packet data network through the WLAN. For example, when the WLAN is activated, the electronic device 200 may transmit a certain message through the WLAN. Additionally, the electronic device 200 may transmit data defined by a communication policy through the WLAN. Namely, by transmitting a certain signal or data through the WLAN, the electronic device 200 may notify the packet data network (e.g., PGW) that the WLAN is activated.

According to an embodiment, when the WLAN is activated, the electronic device 200 may transmit a WLAN wakeup signal to the packet data network. Namely, by doing so, the electronic device 200 may notify the packet data network that transmission and reception of data is allowed through the WLAN (namely, a communication channel established between the electronic device and the packet data network).

According to an embodiment, the operation of transmitting information that indicates the activation or deactivation of the WLAN may further include operation of receiving, from the packet data network through the cellular network, a part of data transmitted by other communication entity or a notification message indicating the reception of data from other communication entity, operation of activating the WLAN, and operation of creating a signal for notifying the activation of the WLAN.

For example, the electronic device 200 may receive specific data from the packet data network. Also, the electronic device 200 may receive a notification message from the packet data network. Here, the specific data may be data received from a communication entity other than the electronic device 200 by the packet data network. Also, the notification message may be a message created by the electronic device 200 to notify the reception of data from other communication entity by the packet data network. The electronic device 200 may activate the WLAN when receiving such data or notification message from the packet data network through the cellular network. According to an embodiment, the electronic device 200 may confirm the content of the received data or notification message and then activate the WLAN if there is a need to activate the WLAN (e.g., when data to be transmitted or received is defined to use the WLAN in a communication policy or when transmission using the WLAN is needed due to a great volume of data to be transmitted or received).

When activating the WLAN, the electronic device 200 may create a signal for notifying this. For example, the electronic device 200 may create a WLAN wakeup signal. Then the electronic device 200 may transmit the created wakeup signal to the packet data network. According to an embodiment, the electronic device 200 may transmit the wakeup signal through the activated WLAN.

Figure 5:
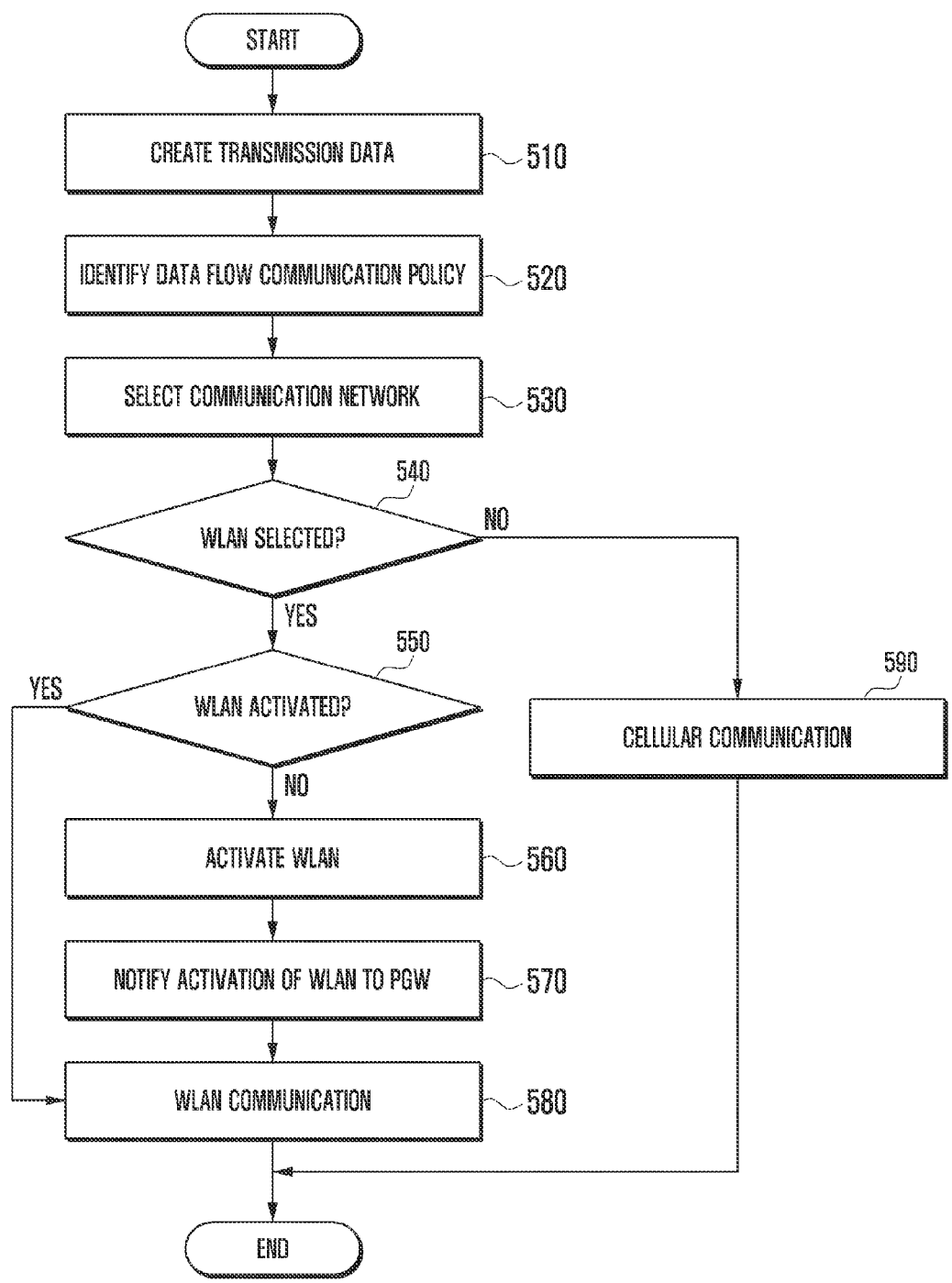
FIG. 5 is a flow diagram illustrating a data transmission process of an electronic device according to an embodiment of the present disclosure.

FIG. 5 is a flow diagram illustrating a data transmission process of an electronic device according to an embodiment of the present disclosure.

At operation 510, the electronic device 200 may create or prepare transmission data to be transmitted to the network.

At operation 520, the electronic device 200 may identify a data flow communication policy. For example, the electronic device 200 may identify a pre-stored data flow communication policy. In this case, the data flow communication policy may contain mapping information about types of networks to transmit data according to a specific IP flow, an application ID, a domain name, or the like. Also, the data flow communication policy may contain mapping information about types of networks to transmit data according to a data transmission throughput, a content type, or a content capacity. According to an embodiment, the electronic device 200 may receive the data flow communication policy from any external entity (e.g., ANDSF). For example, the electronic device 200 may receive an ANDSF rule or an ANDSF policy from the ANDSF.

At operation 530, based on the data flow communication policy, the electronic device 200 may select a communication network to transmit or receive data. For example, the electronic device 200 may determine whether to transmit transmission data through the cellular network (e.g., the LTE network) or through the WLAN (e.g., Wi-Fi).

At operation 540, the electronic device 200 may determine whether the selected communication network is the WLAN. Then the electronic device 200 may perform operation 550 when the selected network is the WLAN, and perform operation 590 when the selected network is not the WLAN but the cellular network.

At operation 550, the electronic device 200 may determine whether the WLAN is in an activated state. Then the electronic device 200 may perform operation 580 when the WLAN is in an activated state, and perform operation 560 when the WLAN is in a deactivated state.

At operation 560, the electronic device 200 may activate the WLAN.

At operation 570, the electronic device 200 may notify the activation of the WLAN to the packet data network (e.g., PGW). For example, using a PCO field of a NAS message of LTE or a mobility option field of a PMIP binding update message of a Wi-Fi interface, the electronic device 200 may notify an activation status of the WLAN to the packet data network (e.g., PGW). According to an embodiment, by transmitting a separate signal to the packet data network, the electronic device 200 may notify the activation of the WLAN.

At operation 580, the electronic device 200 may transmit transmission data to the packet data network (e.g., PGW) through the WLAN. At operation 590, the electronic device 200 may transmit transmission data to the packet data network (e.g., PGW) through the cellular network.

Figure 6:
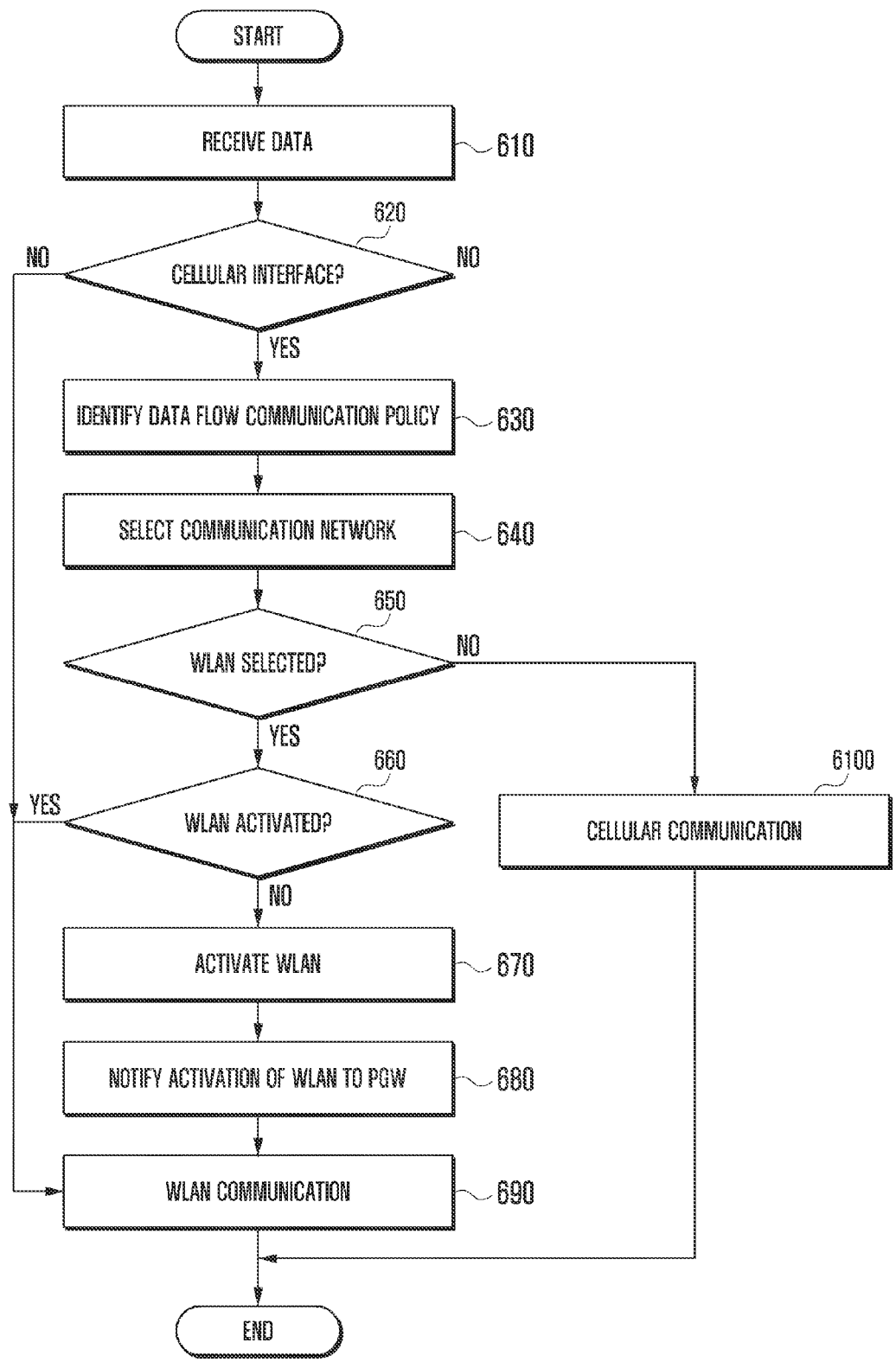
FIG. 6 is a flow diagram illustrating a data reception process of an electronic device according to an embodiment of the present disclosure.

FIG. 6 is a flow diagram illustrating a data reception process of an electronic device according to an embodiment of the present disclosure.

At operation 610, the electronic device 200 may receive data from the packet data network (e.g., PGW).

At operation 620, the electronic device 200 may identify whether an interface which receives data is a cellular interface. Namely, the electronic device 200 may determine whether the data reception interface is a cellular interface or a WLAN interface. Then the electronic device 200 may perform operation 630 when the reception interface is the cellular interface, and perform operation 690 when the reception interface is the WLAN interface.

At operation 630, the electronic device 200 may identify a data flow communication policy. For example, the electronic device 200 may identify a pre-stored data flow communication policy. In this case, the data flow communication policy may contain mapping information about types of networks to transmit data according to a specific IP flow, an application ID, a domain name, a data transmission throughput, a content type, or a content capacity. According to an embodiment, the electronic device 200 may receive the data flow communication policy from any external entity (e.g., ANDSF). For example, the electronic device 200 may receive an ANDSF rule or an ANDSF policy from the ANDSF.

At operation 640, based on the data flow communication policy, the electronic device 200 may select a communication network to transmit or receive data.

At operation 650, the electronic device 200 may determine whether the selected communication network is the WLAN (or Wi-Fi). Then the electronic device 200 may perform operation 660 when the selected network is the WLAN, and perform operation 6100 when the selected network is not the WLAN but the cellular network.

At operation 660, the electronic device 200 may determine whether the WLAN is in an activated state. Then the electronic device 200 may perform operation 690 when the WLAN is in an activated state, and perform operation 670 when the WLAN is in a deactivated state.

At operation 670, the electronic device 200 may activate the WLAN.

At operation 680, the electronic device 200 may notify the activation of the WLAN to the packet data network (e.g., PGW). For example, using a PCO field of a NAS message of LTE or a mobility option field of a PMIP binding update message of a Wi-Fi interface, the electronic device 200 may notify an activation status of the WLAN to the packet data network (e.g., PGW). According to an embodiment, by transmitting a separate signal to the packet data network, the electronic device 200 may notify the activation of the WLAN.

At operation 690, the electronic device 200 may receive data from the packet data network (e.g., PGW) through the WLAN. At operation 6100, the electronic device 200 may receive data from the packet data network (e.g., PGW) through the cellular network.

Figure 7:
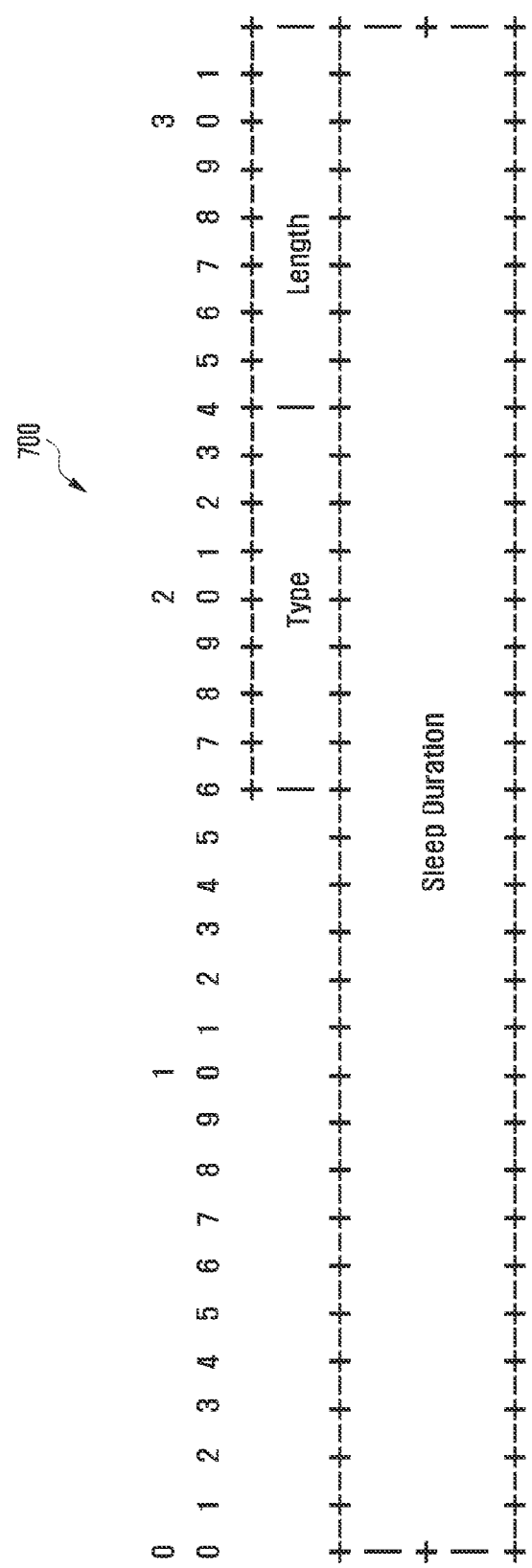
FIG. 7 is a diagram illustrating an example of a binding message used for notifying a status of a wireless local area network (WLAN) to a packet data network by an electronic device according to an embodiment of the present disclosure.

FIG. 7 is a diagram illustrating an example of a binding message 700 used for notifying a status of a wireless local area network to a packet data network by an electronic device according to an embodiment of the present disclosure.

According to an embodiment, the electronic device 200 may define and utilize a new sleep indicator with a mobility option of the binding update message. FIG. 7 shows an example of a data structure in which the mobility option of the binding message 700 is defined as a sleep indicator according to an embodiment of the present disclosure. For example, the electronic device 200 may create a field for notifying a case of deactivation of the WLAN (i.e., a sleep state). For example, a sleep indicator of the binding cache may contain a data type, a data length, and sleep duration. For example, a sleep indicator of the binding cache defined according to an embodiment of the present disclosure may include bits for indicating the type of a mobility message (i.e., a binding message), bits for indicating the length of a mobility option (i.e., a sleep indicator), and bits for indicating sleep duration for deactivating the WLAN. Namely, a sleep indicator may include information about a data type, a data form, a data volume, a data length, whether the electronic device 200 activates or deactivates the WLAN, duration in which the electronic device 200 maintains a deactivated state of the WLAN, and the like. However, the structure of the binding message shown in FIG. 7 is exemplary only and not to be construed as a limitation. Any other information may be added and any illustrated information may be excluded. According to various embodiments of the present disclosure, the binding message (e.g., a sleep indicator) may be defined or created as a modified form of the structure shown in FIG. 7, depending on setting of the electronic device or user.

The electronic device 200 may notify the deactivation of the WLAN by transmitting the binding update message to the packet data network (e.g., PGW). Therefore, the packet data network may recognize the deactivation of the WLAN by the electronic device 200 and then stop the transmission and reception of data through the WLAN without performing a detach procedure for a disconnection from the WLAN.

According to an embodiment, by transmitting the binding update message, the electronic device 200 notifies the packet data network that the WLAN is activated. Since having performed no detach procedure, the packet data network may transmit and receive data to and from the electronic device 200 through the WLAN without a need to perform an additional attach procedure.

Therefore, according to various embodiments of the present disclosure, unnecessary signaling operation may be reduced and power consumption of the electronic device 200 may be optimized.

Figure 8:
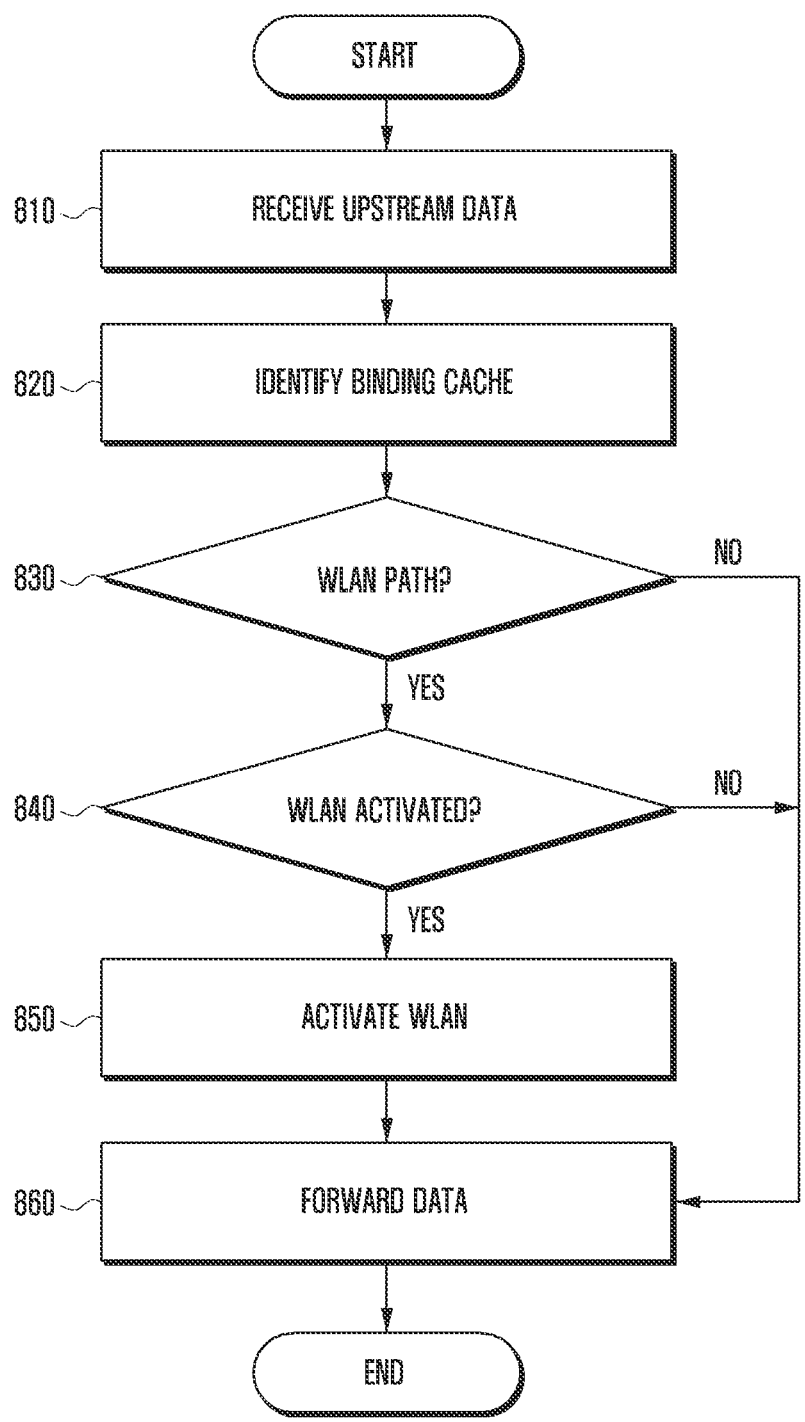
FIG. 8 is a flow diagram illustrating an upstream data reception process of a gateway device according to an embodiment of the present disclosure.

FIG. 8 is a flow diagram illustrating an upstream data reception process of a gateway device according to an embodiment of the present disclosure.

At operation 810, the gateway device 300 may receive upstream data from the electronic device 200.

At operation 820, the gateway device 300 may identify a binding cache. Specifically, from the binding cache, the gateway device 300 may identify a data flow, a home address, a routing address, a binding ID, a flow ID, etc. of the received upstream data. According to an embodiment, the binding cache may include a field or bits for indicating an activation status of the WLAN or Wi-Fi by the electronic device 200. Namely, the gateway device 300 may update the binding cache when the activation status of the WLAN or Wi-Fi is changed, and then determine, by checking the binding cache, whether the WLAN or Wi-Fi is activated or deactivated.

Although it is herein described that the binding cache is used for determining whether the WLAN activation status of the electronic device 200 is activated, the gateway device 300 may store the WLAN activation status of the electronic device 200 in a separate storage other than the binding cache.

At operation 830, the gateway device 300 may determine whether a data reception path is the WLAN. Then the gateway device 300 may perform operation 840 when the data reception path is the WLAN, and perform operation 860 when the data reception path is the cellular network.

At operation 840, the gateway device 300 may determine whether the electronic device 200 activates the WLAN. Then the gateway device 300 may perform operation 860 when the WLAN is activated, and perform operation 850 when the WLAN is deactivated.

At operation 850, the gateway device 300 may perform the activation of the WLAN. For example, if it is verified that the electronic device 200 activates the WLAN, the gateway device 300 may update the binding cache to store information about the activation of the WLAN. According to an embodiment, if it is verified that the electronic device 200 deactivates the WLAN, the gateway device 300 may send a wakeup signal to the electronic device 200 to request the activation of the WLAN.

At operation 860, the gateway device 300 may forward data to the PDN.

Figure 9:
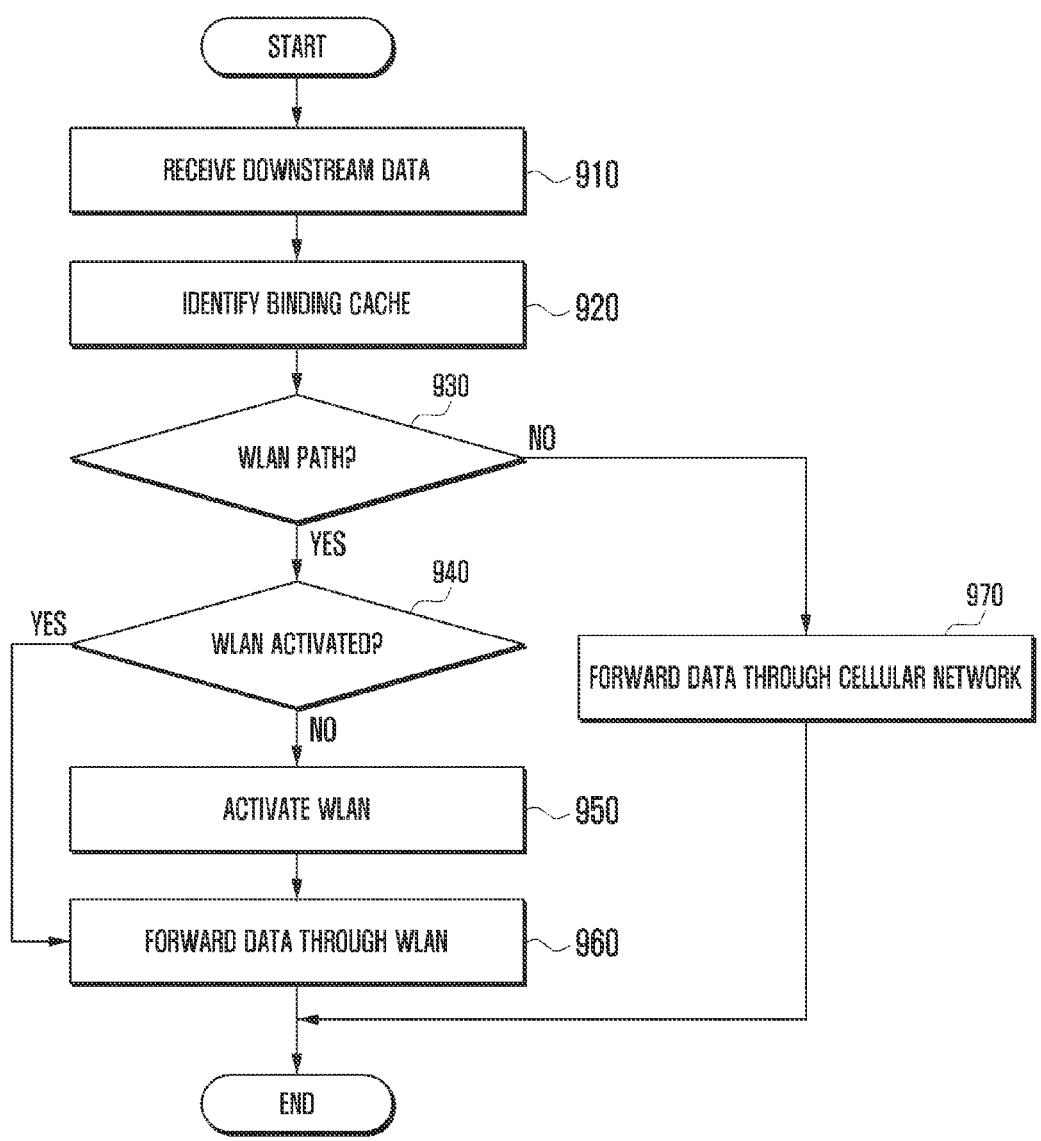
FIG. 9 is a flow diagram illustrating a downstream data reception process of a gateway device according to an embodiment of the present disclosure.

FIG. 9 is a flow diagram illustrating a downstream data reception process of a gateway device according to an embodiment of the present disclosure.

At operation 910, the gateway device 300 may receive downstream data from the PDN.

At operation 920, the gateway device 300 may identify a binding cache. Specifically, from the binding cache, the gateway device 300 may identify a data flow, a home address, a routing address, a binding ID, a flow ID, etc. of the received downstream data. According to an embodiment, the binding cache may include a field or bits for indicating an activation status of the WLAN or Wi-Fi by the electronic device 200. Namely, the gateway device 300 may update the binding cache when the activation status of the WLAN or Wi-Fi is changed, and then determine, by checking the binding cache, whether the WLAN or Wi-Fi is activated or deactivated.

At operation 930, the gateway device 300 may identify a data reception path. For example, the gateway device 300 may check a data flow, etc. and thereby determine whether to transmit and receive data through the WLAN or through the cellular network. Then the gateway device 300 may perform operation 940 in case of data to be transmitted and received through the WLAN, and perform operation 970 in case of data to be transmitted and received through the cellular network.

At operation 940, the gateway device 300 may determine whether the electronic device 200 activates the WLAN. Then the gateway device 300 may perform operation 960 when the WLAN is activated, and perform operation 950 when the WLAN is deactivated.

At operation 950, the gateway device 300 may perform the activation of the WLAN. For example, if it is verified that the electronic device 200 activates the WLAN, the gateway device 300 may update the binding cache to store information about the activation of the WLAN. According to an embodiment, if it is verified that the electronic device 200 deactivates the WLAN, the gateway device 300 may send a wakeup signal to the electronic device 200 to request the activation of the WLAN. According to an embodiment, the gateway device 300 may create and transmit a notification message so as to notify the reception of the downstream data to the electronic device 200. In this case, the electronic device 200 may activate the WLAN in response to the notification message.

At operation 960, the gateway device 300 may forward the downstream data to the electronic device 200 through the WLAN. At operation 970, the gateway device 300 may forward the downstream data to the electronic device 200 through the cellular network.

Figure 10:
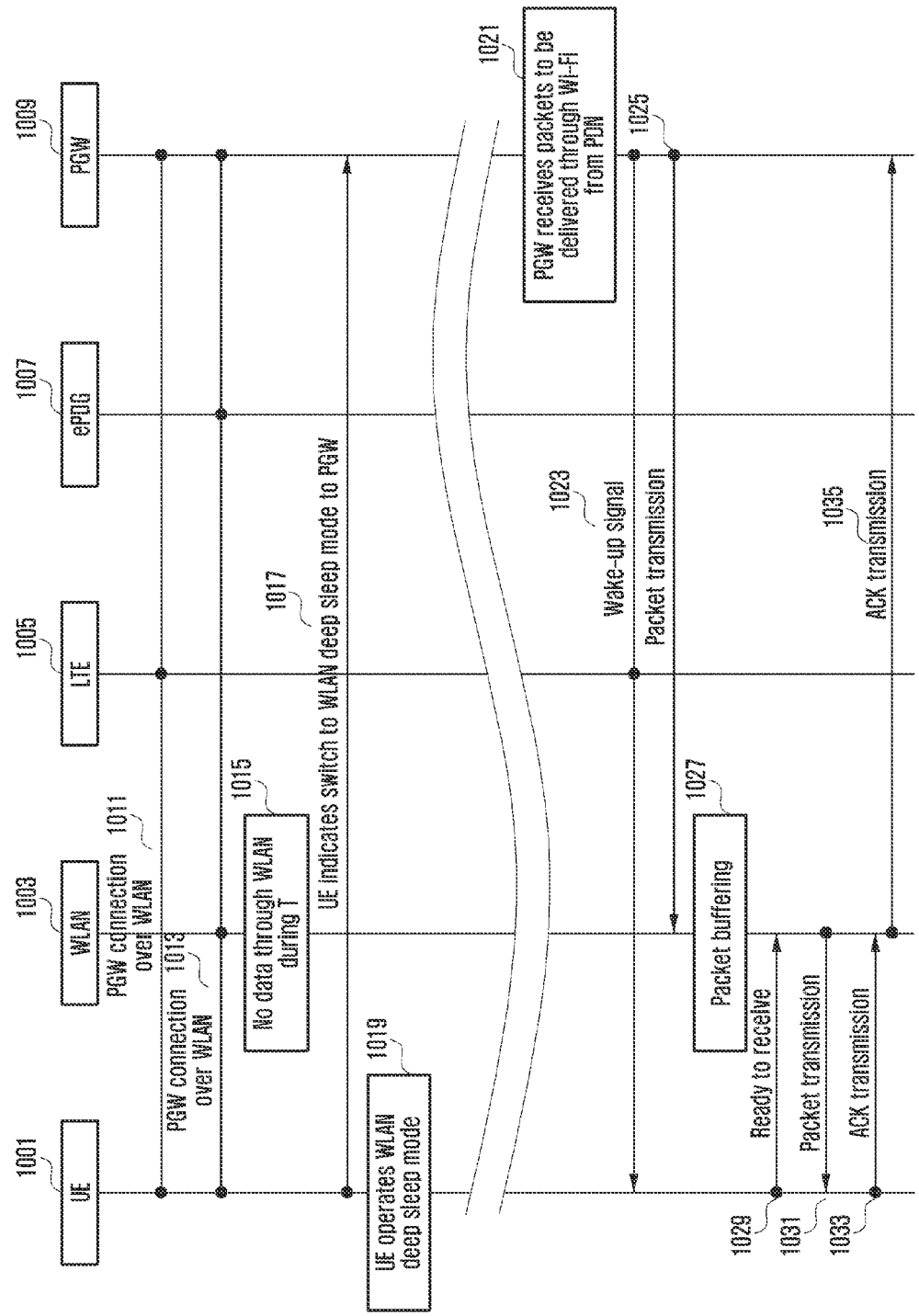
FIG. 10 is a diagram illustrating a signaling process for data transmission with a packet data network in case an electronic device activates a WLAN according to an embodiment of the present disclosure.

FIG. 10 is a diagram illustrating a signaling process for data transmission with a packet data network in case an electronic device activates a wireless local area network according to an embodiment of the present disclosure.

At operation 1011, UE 1001 may be connected to a PGW 1009 through an LTE network 1005. At operation 1013, the UE 1001 may be connected to the PGW 1009 through a WLAN 1003 and an ePDG 1007. Namely, the UE 1001 may be connected to the PGW 1009 through both the LTE network 1005 and the WLAN 1003.

At operation 1015, the UE 1001 may determine whether no data is transmitted through the WLAN during a predetermined time T. According to an embodiment, the UE 1001 may set or change the predetermined time T in response to a user input. When there is no data traffic through the WLAN more than the predetermined time T, the UE 1001 may determine the deactivation of the WLAN.

At operation 1017, the UE 1001 may notify the deactivation of the WLAN (e.g., a switch to a WLAN sleep mode) to the PGW 1009. According to an embodiment, the UE 1001 may transmit, to the PGW 1009, a binding update message or an LTE NAS message having a PCO field to which WLAN status information is added.

At operation 1019, the UE 1001 may deactivate the WLAN 1003. Namely, the UE 1001 may transmit and receive all data to and from the PGW through the LTE network 1005.

At operation 1021, the PGW 1009 may receive packets to be delivered through the WLAN 1003 (e.g., Wi-Fi) from the PDN.

At operation 1023, the PGW 1009 may transmit a wakeup signal to the UE 1001 through the LTE network 1005. Namely, the PGW 1009 may transmit a signal for requesting the UE 1001 to activate the WLAN 1003 since there is data to be delivered through the WLAN 1003.

At operation 1025, the PGW 1009 may transmit data packet received from the PDN to the WLAN 1003.

At operation 1027, buffering of data packet transmitted by the PGW 1009 may occur at the WLAN 1003. Namely, data packet buffering may occur until the UE 1001 activates the WLAN 1003 to be able to receive data.

At operation 1029, the UE 1001 may inform the WLAN 1003 about being ready to receive. For example, the UE 1001 may activate a WLAN (or Wi-Fi) function thereof in response to the wakeup signal received from the PGW 1009. After WLAN activation, the UE 1001 may transmit, to the WLAN 1003, a signal indicating a state being ready to receive data.

At operation 1031, the UE 1001 may receive data packet through the WLAN 1003.

At operation 1033, the UE 1001 may transmit, to the WLAN 1003, an ACK signal or message that reports the receipt of data packet.

At operation 1035, the PGW 1009 may receive the ACK signal or message from the UE 1001 through the WLAN 1003.

According to an embodiment of the present disclosure, if the UE 1001 deactivates the WLAN 1003, and if data to be delivered through the WLAN 1003 is received from the PDN, the PGW 1009 may transmit a wakeup signal for activation of the WLAN 1003 to the UE 1001. Therefore, the WLAN 1003 may be activated and then perform transmission and reception of data.

Figure 11:
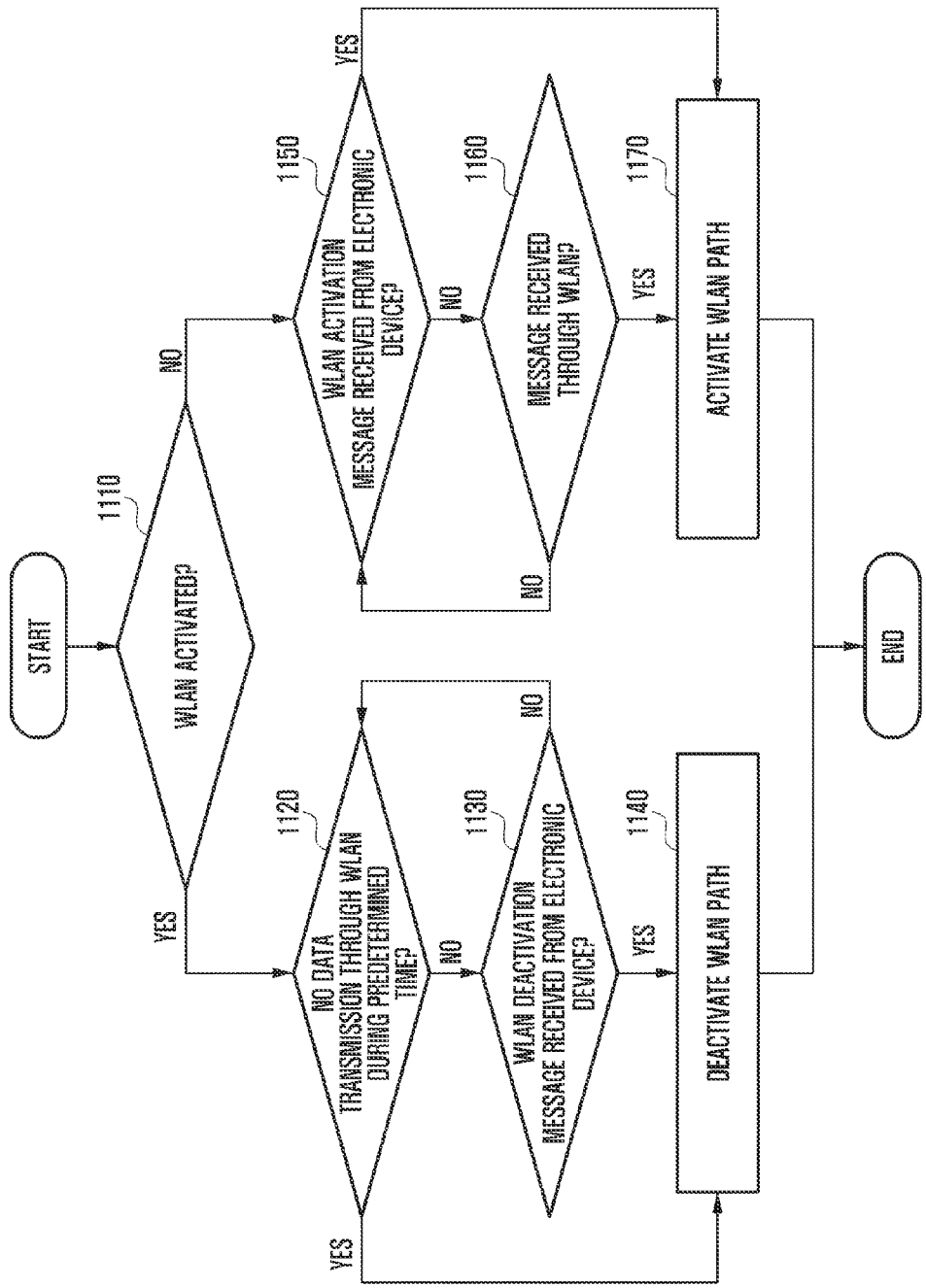
FIG. 11 is a flow diagram illustrating the operation of a gateway device according to an embodiment of the present disclosure.

FIG. 11 is a flow diagram illustrating the operation of a gateway device according to an embodiment of the present disclosure.

At operation 1110, the gateway device 300 may determine whether the electronic device 200 (i.e., UE) activates the WLAN (or Wi-Fi). According to an embodiment, the gateway device 300 may identify a WLAN activation status of the electronic device 200 stored in the binding cache. Then the gateway device 300 may perform operation 1120 when the WLAN is in an activated state, and perform operation 1150 when the WLAN is in a deactivated state.

At operation 1120, the gateway device 300 may determine whether there is no data transmission through the WLAN during a predetermined time. According to an embodiment, using a timer synchronized with the electronic device 200, the gateway device 300 may check whether there is no data transmission through the WLAN during a predetermined time. For example, if the electronic device 200 deactivates the WLAN due to no data transmission through the WLAN during a predetermined time, the gateway device 300 may recognize the deactivation of the WLAN by the electronic device 200 by using the timer synchronized with the electronic device 200. Namely, if there is no data transmission through the WLAN during the same preset time, the electronic device 200 may deactivate the WLAN, and the gateway device 300 may determine that the electronic device 200 deactivates the WLAN. Therefore, even though no signal is transmitted between the electronic device 200 and the gateway device 300, it is possible to recognize that the WLAN is deactivated.

The gateway device 300 may perform operation 1130 when there is data transmission through the WLAN during a predetermined time, and perform operation 1140 when there is no data transmission through the WLAN.

At operation 1130, the gateway device 300 may determine whether a WLAN deactivation message is received from the electronic device 200. For example, the gateway device 300 may receive a binding update message or a NAS message from the electronic device 200. This binding update message or NAS message may contain information that indicates the deactivation of the WLAN. The gateway device 300 may perform operation 1140 when the WLAN deactivation message is received from the electronic device 200, and perform operation 1120 when no WLAN deactivation message is received.

At operation 1140, the gateway device 300 may deactivate the WLAN. Also, the gateway device 300 may store, in the memory unit (e.g., the binding cache), information that the electronic device 200 deactivates the WLAN. For example, the gateway device 300 may update a WLAN status field of the binding cache. Then the gateway device 300 may transmit and receive a signal to and from the electronic device 200 by using the cellular network until the electronic device 200 activates the WLAN.

At operation 1150, the gateway device 300 may determine whether a WLAN activation message is received from the electronic device 200. For example, the gateway device 300 may receive a binding update message or a NAS message from the electronic device 200. This binding update message or NAS message may contain information that indicates the activation of the WLAN. The gateway device 300 may perform operation 1170 when the WLAN activation message is received from the electronic device 200, and perform operation 1160 when no WLAN activation message is received.

At operation 1160, the gateway device 300 may determine whether a message received from the electronic device 200 is received through the WLAN. For example, if any signal or data is received through the WLAN, the gateway device 300 may determine that the electronic device 200 activates the WLAN. Then the gateway device 300 may perform operation 1170 in case of receiving a message through the WLAN, and perform operation 1150 in case of receiving no message through the WLAN.

At operation 1170, the gateway device 300 may activate a path of the WLAN. Also, the gateway device 300 may store, in the memory unit (e.g., the binding cache), information that the electronic device 200 activates the WLAN. For example, the gateway device 300 may update a WLAN status field of the binding cache. Then the gateway device 300 may transmit and receive a signal to and from the electronic device 200 by using the WLAN.

Figure 12:
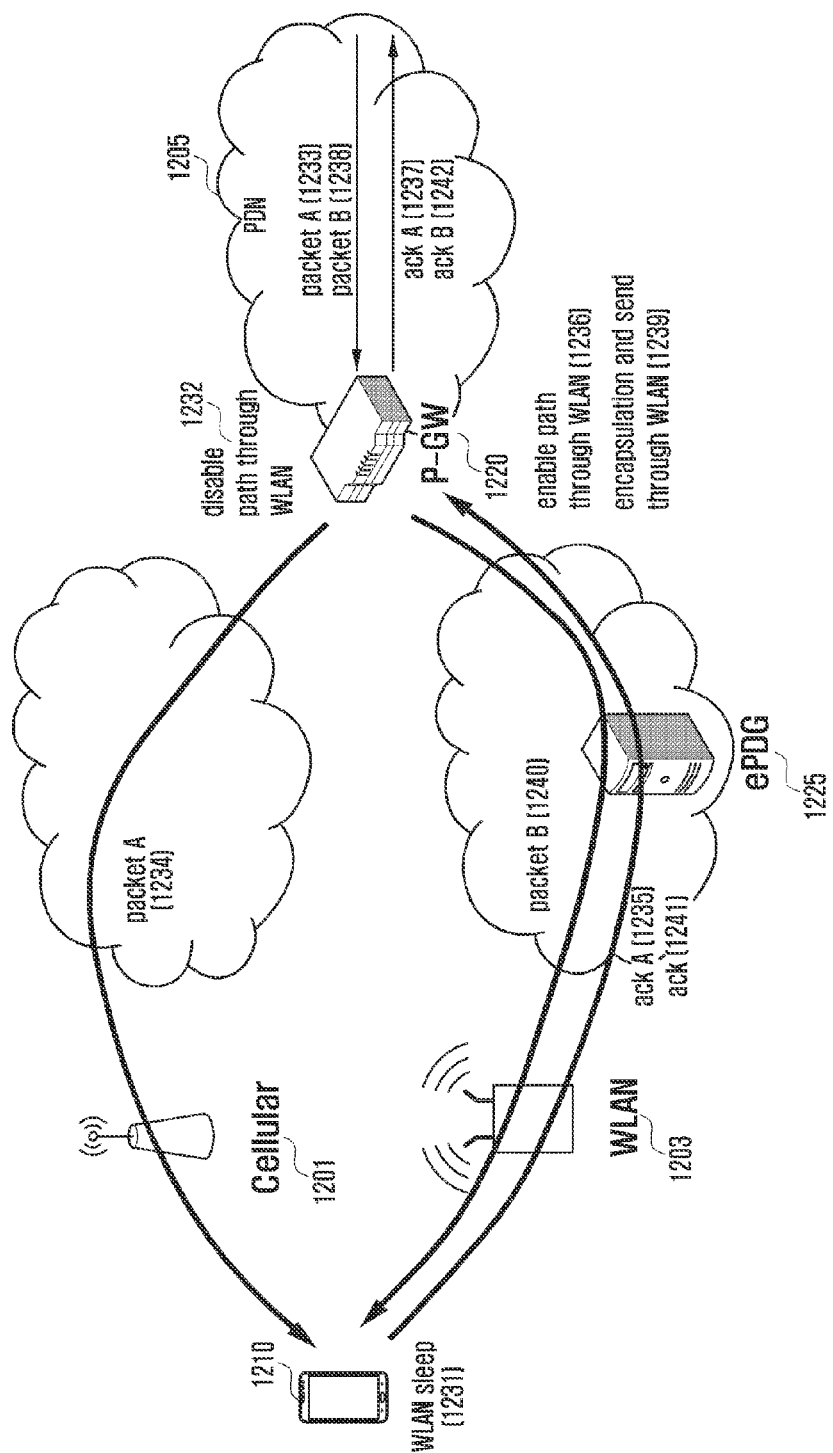
FIG. 12 is a diagram illustrating a data transmission process between an electronic device and a packet data network according to an embodiment of the present disclosure.

FIG. 12 is a diagram illustrating a data transmission process between an electronic device and a packet data network according to an embodiment of the present disclosure.

At operation 1231, UE 1210 may deactivate a WLAN 1203. For example, when there is a user input or when a specific condition is satisfied (e.g., there is no data transmission through the WLAN 1203 during a given time), the UE 1210 may turn off the WLAN 1203 or deactivate the WLAN 1203 to a sleep mode.

At operation 1232, a PGW 1220 may receive information indicating an activation status of the WLAN 1203 from the UE 1210 or recognize, by using a synchronized timer, the deactivation of the WLAN 1203 by the UE 1210. Then the PGW 1220 may update a WLAN activation status of the UE 1210 in the binding cache. Namely, the PGW 1220 may store information that the UE 1210 deactivates the WLAN 1203. After recognizing the deactivation of the WLAN 1203 by the UE 1210, the PGW 1220 may terminate data transmission/reception through the WLAN 1203 and instead perform data transmission/reception through a cellular network 1201.

At operation 1233, the PGW 1220 may receive downstream data, packet A, which is transmitted from a PDN 1205 to the UE 1210. Then, at operation 1234, the PGW 1220 may transmit the packet A through the cellular network 1201. For example, when any data is received from the PDN 1205, the PGW 1220 may check a WLAN activation status of the UE 1210 stored in the binding cache. Then, in case the UE 1210 deactivates the WLAN 1203, the PGW 1220 may transmit all data through the cellular network 1201.

At operation 1235, the UE 1210 may identify information about the packet A. Also, the UE 1210 may identify a communication policy associated with the packet A. If it is determined that the packet A is data to be transmitted through the WLAN, the UE 1210 may transmit an acknowledgement message, ack A, indicating the receipt of the packet A, to the PGW 1220 through the WLAN 1203. In this case, the UE 1210 may send the ack A to an ePDG 1225 through the WLAN 1203, and then the ePDG 1225 may deliver the ack A to the PGW 1220 through the WLAN 1203.

At operation 1236, the PGW 1220 may recognize the activation of the WLAN 1203 by the UE 1210, based on the ack A received from the UE 1210 through the WLAN 1203. Then the PGW 1220 may update the activation of the WLAN 1203 in the binding cache.

At operation 1237, the PGW 1220 may forward the ack A to the PDN 1205.

At operation 1238, the PGW 1220 may receive, from the PDN 1205, packet B of the same flow as the packet A.

At operation 1239, the PGW 1220 may check the binding cache and thereby recognize that the packet B should be transmitted through the WLAN. Then the PGW 1220 may perform encapsulation of the packet B and send it through the WLAN 1203. At operation 1240, the packet B transmitted by the PGW 1220 may be delivered to the UE 1210 through the ePDG 1225 and the WLAN 1203.

At operation 1241, the UE 1210 may transmit an acknowledgement message, ack B, indicating the receipt of the packet B, to the PGW 1220 through the WLAN 1203. Then, at operation 1242, the PGW 1220 may deliver the ack B to the PDN 1205.

According to an embodiment of the present disclosure, after deactivating the WLAN 1203, the UE 1210 may notify the activation of the WLAN 1203 to the PGW by sending any data to the PGW 1220 through the WLAN 1203. The PGW 1220 may check which network is used for transmission of the received data, and in case of transmission through the WLAN 1203, update a pre-stored WLAN activation status of the UE (e.g., binding cache). Thereafter, in case of data having the same IP flow, the same form, or the same category in a communication policy, the PGW 1220 may transmit or receive such data to or from the UE 1210 through the WLAN 1203.

As fully discussed hereinbefore, the electronic device, the gateway device, and signal transmission/reception methods thereof according to various embodiments of the present disclosure may prevent unnecessary signal transmission and operation of the electronic device and thereby minimize power consumption.

Additionally, in various embodiments of the present disclosure, the electronic device, the gateway device, and signal transmission/reception methods thereof may notify a WLAN activation status of the electronic device to the packet data network without signaling overhead such as attach/detach procedures.

Additionally, in various embodiments of the present disclosure, the electronic device, the gateway device, and signal transmission/reception methods thereof may allow offloading based on recognition of a WLAN activation status of the electronic device without unnecessary signaling overhead.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device for transmitting and receiving data in a mobile communication system, the electronic device comprising:
    a communication unit configured to transmit and to receive a signal to and from another communication entity; and
    a control unit configured to:
        determine whether to activate a wireless local area network (WLAN), and
        transmit information about activation or deactivation of the WLAN to a packet data network so as to maintain a created channel and authentication for data transmission and reception,
    wherein the control unit is further configured, when the WLAN which is in a deactivated state is activated, to transmit a message for indicating activation of the WLAN to the packet data network through the WLAN.

2. The electronic device of claim 1, wherein the information about the activation or deactivation of the WLAN comprises WLAN sleep information.

3. The electronic device of claim 1, wherein the control unit is further configured to:
check whether the WLAN is activated, and
if the WLAN is activated, transmit a WLAN wakeup signal to the packet data network so as to notify that transmission and reception of data is allowed through the created channel.

4. The electronic device of claim 1, wherein the packet data network is a packet data network gateway (PGW).

5. The electronic device of claim 3, wherein the control unit is further configured to activate the WLAN and create the WLAN wakeup signal when a part of data transmitted by the other communication entity or a notification message indicating reception of data from the other communication entity is received from the packet data network through a cellular network.

6. The electronic device of claim 1, wherein the control unit is further configured to establish that a signal transmitted to or received from the other communication entity should be transmitted or received through only the WLAN.

7. The electronic device of claim 1, wherein the control unit is further configured to:
add the information about activation or deactivation of the WLAN to a binding update message, and
transmit the binding update message to the packet data network.

8. The electronic device of claim 1, wherein the control unit is further configured to:
add the information about activation or deactivation of the WLAN to a protocol configuration option (PCO) field of a non-access stratum (NAS) message, and
transmit the NAS message to the packet data network.

9. The electronic device of claim 1, wherein the control unit is further configured to change an activation status of the WLAN by determining whether data received from the packet data network is data to be transmitted using the WLAN.

10. The electronic device of claim 1, wherein the control unit is further configured to, using a timer synchronized with the packet data network, deactivate the WLAN when there is neither transmission nor reception of data through the WLAN during a predetermined time.

11. The electronic device of claim 1, wherein the control unit is further configured to select a communication network to transmit and receive data, based on at least one of an IP flow, an application ID, a domain name, a throughput, a content type, and a content capacity.

12. A gateway device for transmitting and receiving data in a mobile communication system, the gateway device comprising:
a communication unit configured to transmit and to receive a signal to and from another communication entity; and
a control unit configured to select a communication network to transmit and receive data, depending on information about activation or deactivation of a wireless local area network (WLAN) by an electronic device, the information being received from the electronic device,
wherein the control unit is further configured to, using a timer synchronized with the electronic device, determine that the electronic device deactivates the WLAN when there is neither transmission nor reception of data through the WLAN during a predetermined time.

13. The gateway device of claim 12, further comprising:
a memory unit configured to store the information about the activation or deactivation of the WLAN by the electronic device.

14. A method for transmitting and receiving a signal at an electronic device in a mobile communication system, the method comprising:
determining whether to activate a wireless local area network (WLAN); and
transmitting information about activation or deactivation of the WLAN to a packet data network so as to maintain a created channel and authentication for data transmission and reception,
wherein the transmitting of the information includes, when the WLAN which is in a deactivated state is activated, transmitting a message for indicating activation of the WLAN to the packet data network through the WLAN.

15. The method of claim 14, wherein the information about the activation or deactivation of the WLAN comprises WLAN sleep information.

16. The method of claim 14, wherein the transmitting of the information includes, if the WLAN is activated, transmitting a WLAN wakeup signal to the packet data network so as to notify that transmission and reception of data is allowed through the created channel.

17. The method of claim 16, wherein the transmitting of the information further includes:
receiving, from the packet data network through a cellular network, a part of data transmitted by the other communication entity or a notification message indicating reception of data from the other communication entity;
activating the WLAN in response to the part of data or the notification message; and
creating the WLAN wakeup signal.

18. The method of claim 14, wherein the packet data network is a packet data network gateway (PGW).

19. The method of claim 14, wherein a signal transmitted to or received from the other communication entity is established to have to be transmitted or received through only the WLAN.

20. The method of claim 14, wherein the transmitting of the information includes adding the information about activation or deactivation of the WLAN to a binding update message, and transmitting the binding update message to the packet data network.

21. The method of claim 14, wherein the transmitting of the information includes adding the information about activation or deactivation of the WLAN to a protocol configuration option (PCO) field of a non-access stratum (NAS) message, and transmitting the NAS message to the packet data network.

22. The method of claim 14, wherein the determining of whether to activate the WLAN includes:
receiving data from the packet data network;
determining whether the received data is data to be transmitted using the WLAN; and
if the received data is data to be transmitted using the WLAN, activating the WLAN.

23. The method of claim 14, wherein the determining of whether to activate the WLAN includes, using a timer synchronized with the packet data network, deactivating the WLAN when there is neither transmission nor reception of data through the WLAN during a predetermined time.

24. The method of claim 14, further comprising:
  selecting a communication network to transmit and receive data, based on at least one of an IP flow, an application ID, a domain name, a throughput, a content type, and a content capacity.

25. A method for transmitting and receiving a signal at a gateway device in a mobile communication system, the method comprising:
  receiving information about activation or deactivation of a wireless local area network (WLAN) by an electronic device from the electronic device;
  using a timer synchronized with the electronic device, determining that the electronic device deactivates the WLAN when there is neither transmission nor reception of data through the WLAN during a predetermined time; and
  selecting a communication network to transmit and receive data, depending on the received information.

26. The method of claim 25, further comprising:
  storing, in a binding cache, the information about activation or deactivation of the WLAN by the electronic device.

\* \* \* \* \*